United States Patent
Miyasa et al.

(10) Patent No.: US 10,417,777 B2
(45) Date of Patent: Sep. 17, 2019

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Kazuhiro Miyasa, Narashino (JP); Ryo Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 15/400,074

(22) Filed: Jan. 6, 2017

(65) Prior Publication Data

US 2017/0206670 A1 Jul. 20, 2017

(30) Foreign Application Priority Data

Jan. 15, 2016 (JP) .................. 2016-006556
Oct. 21, 2016 (JP) .................. 2016-207259

(51) Int. Cl.
*G06T 7/33* (2017.01)
*G06T 7/11* (2017.01)
(Continued)

(52) U.S. Cl.
CPC .............. *G06T 7/33* (2017.01); *G06K 9/4604* (2013.01); *G06T 7/0012* (2013.01); *G06T 7/11* (2017.01);
(Continued)

(58) Field of Classification Search
None
See application file for complete search history.

(56) References Cited

U.S. PATENT DOCUMENTS 8,675,944 B2 3/2014 Razeto et al.
9,311,709 B2 4/2016 Miyasa et al.
(Continued)

FOREIGN PATENT DOCUMENTS

JP 2013-141603 A 7/2013
WO 2015/060330 A1 4/2015

OTHER PUBLICATIONS

Maintz, et al., "A Survey of Medical Image Registration," Medical Image Analysis, Oxford Univ., vol. 2, No. 1 (1998).
(Continued)

*Primary Examiner* — Tahmina N Ansari
(74) *Attorney, Agent, or Firm* — Venable LLP

(57) ABSTRACT

An image processing apparatus obtains a first image and a second image obtained by imaging an object under different conditions, obtains a region of interest in the first image, obtains a first deformation displacement field between the first image and the second image, approximates the first deformation displacement field in the region of interest using an approximation transformation model of a degree of freedom lower than that of the first deformation displacement field, thereby generating an approximated displacement field, generates, concerning the region of interest, corresponding information between the first image and an image obtained by displacing the first image based on the approximated displacement field, and obtains a second deformation displacement field between the first image and the second image using the corresponding information.

22 Claims, 13 Drawing Sheets

(51) Int. Cl.
*G06K 9/46* (2006.01)
*G06T 7/00* (2017.01)

(52) U.S. Cl.
CPC ............... *G06T 2207/10028* (2013.01); *G06T 2207/10076* (2013.01); *G06T 2207/10081* (2013.01); *G06T 2207/10088* (2013.01); *G06T 2207/10101* (2013.01); *G06T 2207/10104* (2013.01); *G06T 2207/10108* (2013.01); *G06T 2207/10136* (2013.01); *G06T 2207/20104* (2013.01); *G06T 2207/30068* (2013.01)

(56) References Cited

U.S. PATENT DOCUMENTS

| | | | |
|---|---|---|---|
| 9,324,148 B2 | 4/2016 | Ishikawa et al. | |
| 2012/0155734 A1* | 6/2012 | Barratt | G06T 7/35 |
| | | | 382/131 |
| 2013/0182925 A1 | 7/2013 | Razeto et al. | |
| 2014/0003690 A1 | 1/2014 | Razeto et al. | |
| 2015/0070469 A1 | 3/2015 | Yoshibayashi et al. | |
| 2015/0097833 A1 | 4/2015 | Razeto et al. | |
| 2015/0104091 A1* | 4/2015 | Miyasa | G06T 7/344 |
| | | | 382/131 |
| 2016/0042248 A1 | 2/2016 | Endo et al. | |
| 2016/0263399 A1* | 9/2016 | Matsuzaki | A61N 5/1049 |
| 2017/0030403 A1* | 2/2017 | Kurose | B25J 18/06 |
| 2017/0206670 A1* | 7/2017 | Miyasa | G06T 7/11 |

OTHER PUBLICATIONS

Jul. 13, 2017 European Search Report in European Patent Appln. No. EP 16002762.9.

Rohr, K. et al., "Landmark-Based Elastic Registrations Using Approximating Thin-Plate Splines", IEEE Transactions on Medical Imaging, Jun. 2001, vol. 20, No. 6, p. 526-534.

Jan. 2, 2019 European Search Report in European Patent Appln. No. 18191466.4.

* cited by examiner

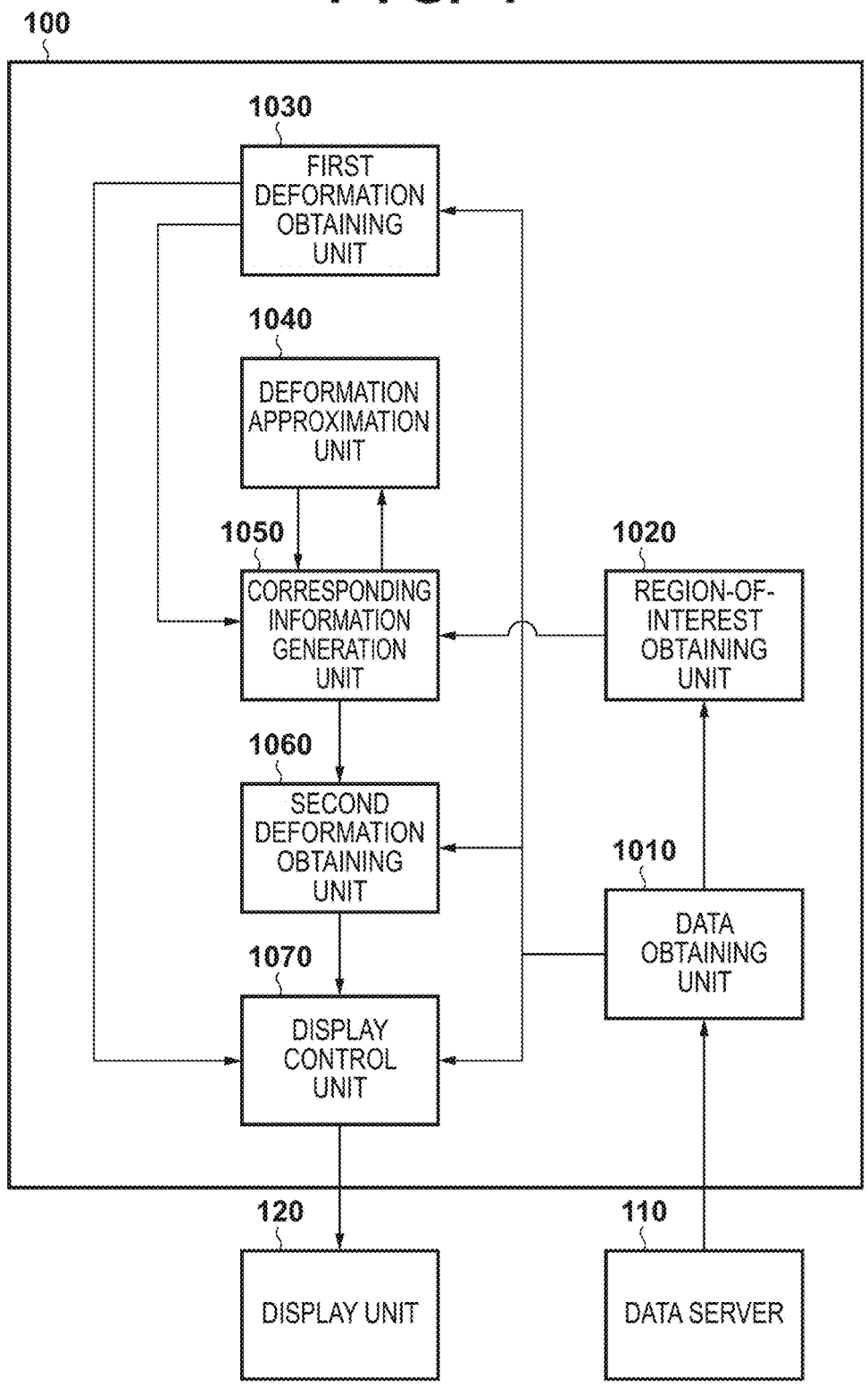

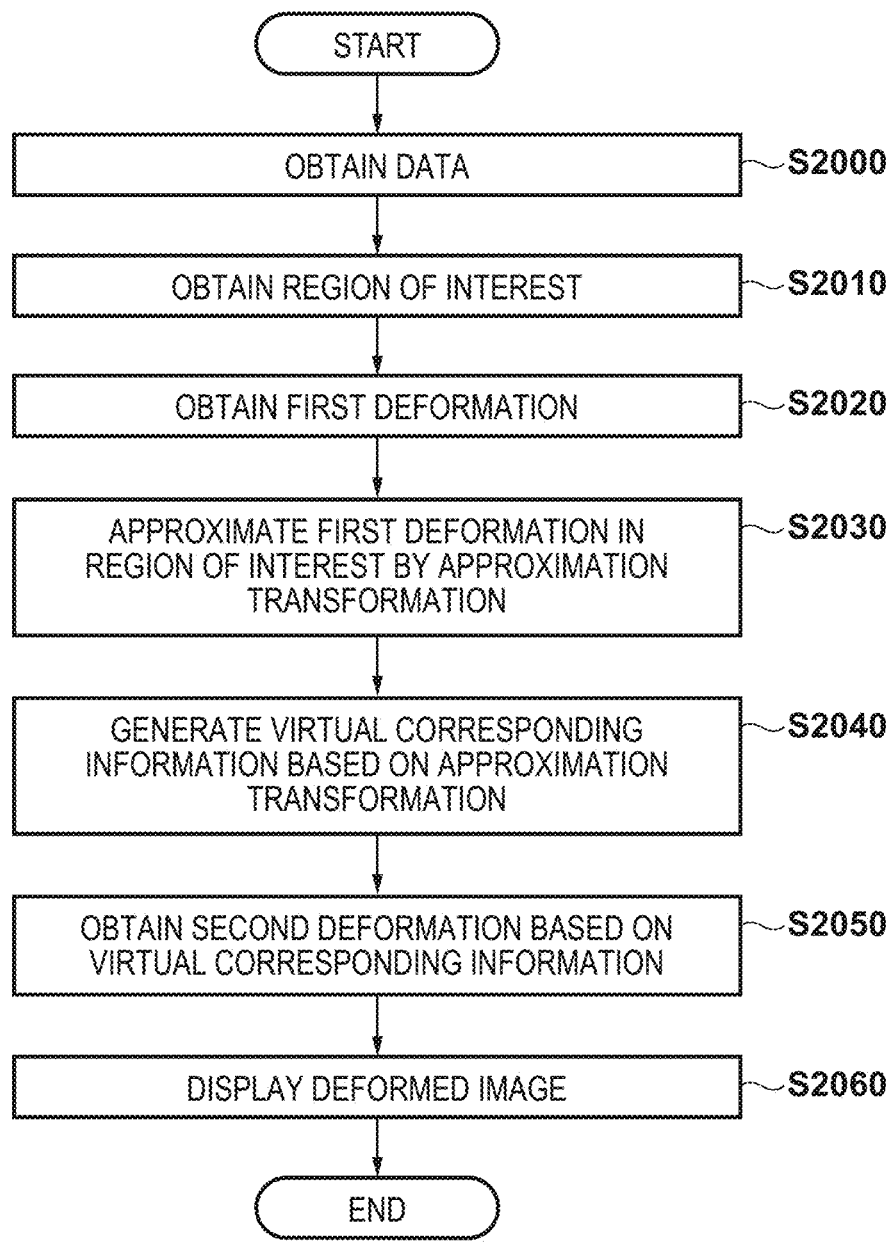

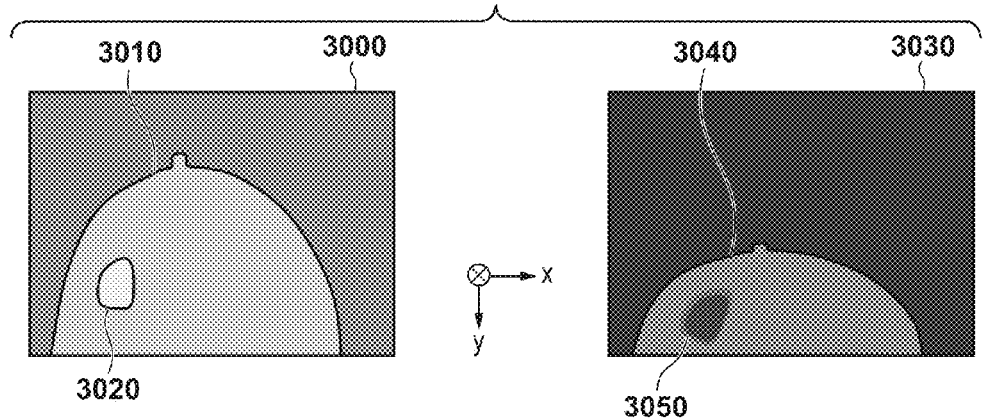
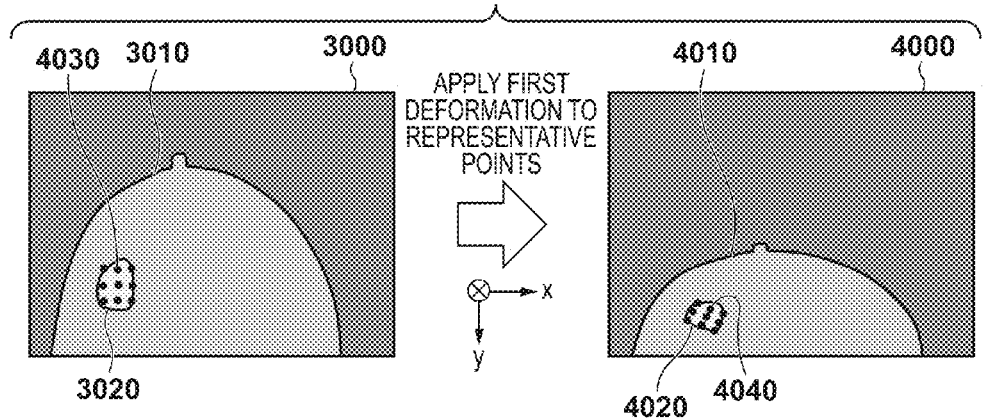
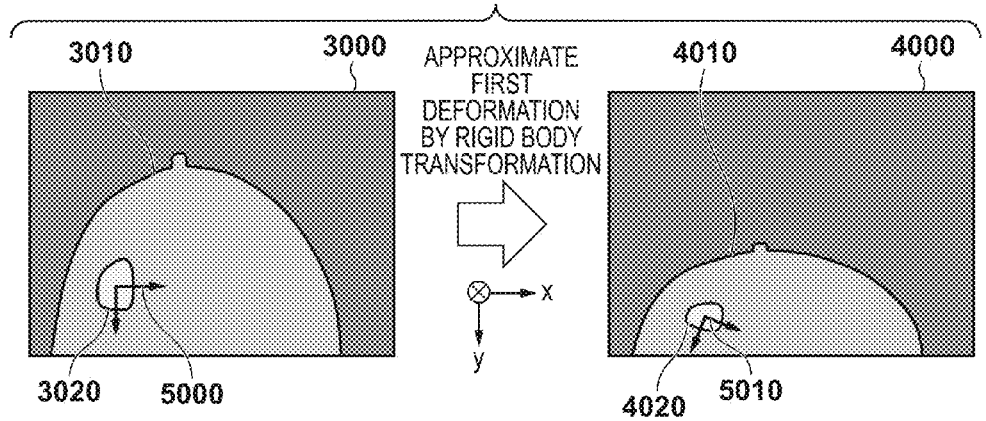

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus that processes three-dimensional images obtained by various kinds of imaging apparatuses (modalities) such as a nuclear magnetic resonance imaging (MRI) apparatus, an X-ray computed tomography (X-ray CT) imaging apparatus, and an ultrasonic (US) image diagnostic apparatus, an image processing method, and a non-transitory computer-readable storage medium.

Description of the Related Art

In image diagnosis using three-dimensional images (three-dimensional tomographic images), a doctor makes a diagnosis while comparing images obtained using a plurality of imaging apparatuses (modalities) and different positions, times, and imaging parameters. However, since the object shape changes between the images, it is difficult to identify or compare the lesion. There is an attempt to do deformation alignment (deformation estimation) between a plurality of images. This makes it possible to deform one image and generate a deformed image in which the position or shape of an object visualized in the image almost matches that in another image. It is also possible to calculate and present the position of a point on the other image, which corresponds to a point of interest on the one image. As a result, the doctor can easily identify or compare the lesion between the plurality of images. In a field other than the medical field, the same operation as described above may be executed for the purpose of inspecting the internal state of an object using three-dimensional images.

At this time, an image includes various organs and body tissues, and tissue hardness changes depending on the type. For example, a bone is very hard, and therefore, its shape hardly changes even if the posture or shape of the object changes between images to be compared. There also exists a lesion such as a tumor that is harder than a tissue on the periphery depending on the type, and hardly changes the shape. Hence, if deformation alignment (deformation estimation) is performed by handling the hard tissue like the soft tissue on the periphery, the hard region that is not actually deformed may be estimated as deformed, and a wrong alignment result may be obtained.

As a solution to this problem, Japanese Patent Laid-Open No. 2013-141603 proposes a technique of, in a displacement field obtained by non-rigid body alignment, bringing only the displacement field of a hard region of interest that should be a rigid body close to rigid body transformation, thereby avoiding the region of interest from being erroneously estimated as deformed. More specifically, this literature describes a technique of approximating only the deformation of a region of interest to rigid body transformation, generating the displacement field of the approximated rigid body transformation for the region of interest, generating the displacement field of original deformation alignment for a region of non-interest, and generating a displacement field by spatially combining those displacement fields. A displacement field here means a field that holds transformation (displacement) between positions in two images. As described above, this literature discloses a technique of performing deformation alignment (deformation estimation) between images using a transformation model of a different characteristic depending on a region in an image. A transformation model here represents a model used to transform the coordinates of each position on an image in the alignment.

However, in the technique disclosed in Japanese Patent Laid-Open No. 2013-141603, coordinate transformation is represented using transformation models of different characteristics for a region of interest and a region of non-interest. Interpolation is performed, and the regions are combined, thereby attaining overall deformation alignment. Hence, a consistent deformation cannot be obtained particularly at the joint.

SUMMARY OF THE INVENTION

According to one aspect of the present invention, there is provided an image processing apparatus which comprises: a data obtaining unit configured to obtain a first image and a second image obtained by imaging an object under different conditions; a region-of-interest obtaining unit configured to obtain a region of interest in the first image; a first deformation obtaining unit configured to obtain a first deformation displacement field between the first image and the second image; a deformation approximation unit configured to approximate the first deformation displacement field in the region of interest using an approximation transformation model of a degree of freedom lower than that of the first deformation displacement field, thereby generating an approximated displacement field; a corresponding information generation unit configured to generate, concerning the region of interest, corresponding information between the first image and an image obtained by displacing the first image based on the approximated displacement field; and a second deformation obtaining unit configured to obtain a second deformation displacement field between the first image and the second image using the corresponding information.

Further features of the present invention will become apparent from the following description of exemplary embodiments (with reference to the attached drawings).

BRIEF DESCRIPTION OF THE DRAWINGS

FIG. 1 is a block diagram showing the arrangement of an image processing system according to the first embodiment;

FIG. 2 is a flowchart showing an overall processing procedure according to the first embodiment;

FIG. 3 is a view showing a first image and a second image of the same object;

FIG. 4 is a schematic view for explaining a state in which a first deformation is applied to the first image and representative points;

FIG. 5 is a schematic view for explaining a state in which the first deformation of a region of interest is approximated by rigid body transformation;

DESCRIPTION OF THE EMBODIMENTS

Figure 6:
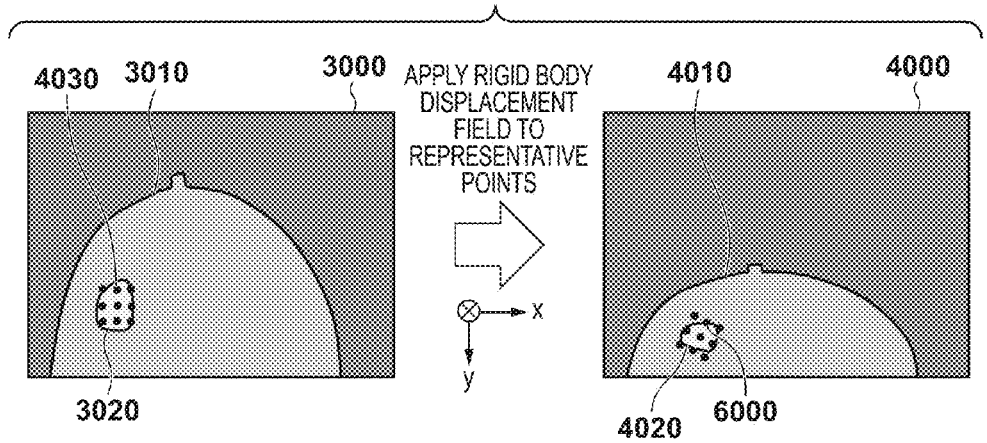
FIG. 6 is a schematic view for explaining a state in which approximated virtual corresponding points are generated on the region of interest.

Preferred embodiments of an image processing apparatuses according to the present invention will now be described in detail with reference to the accompanying drawings. However, the technical scope of the present invention is not limited to the illustrated examples.

First Embodiment

An image processing apparatus according to this embodiment performs deformation alignment between a first image and a second image that are three-dimensional images. If a region that should be hard such as a hard lesion or a bone is given as a region of interest on the first image, the image processing apparatus performs deformation alignment that is consistent for the entire image while keeping the region of interest as a rigid body. The image processing apparatus can also perform deformation alignment by applying not only rigid body transformation but also a deformation of a degree of freedom lower than that for the entire image to the region of interest. The deformation alignment means estimating a deformation to be applied to the first image such that the shape of an object in the first image matches the shape of the object in the second image. The deformation alignment also means generating a deformed image by thus deforming the first image.

More specifically, the image processing apparatus according to this embodiment first performs first deformation alignment between two images based on a predetermined evaluation function used to evaluate the adequacy of the alignment. Next, the image processing apparatus approximates a local deformation of the region of interest in the first image obtained by the first deformation alignment by transformation of a low degree of freedom such as rigid body transformation. For each of a plurality of representative points on the region of interest, the image processing apparatus obtains a point (displaced point) by displacing the representative point from the first image to the second image using the approximated transformation, and generates corresponding points (a pair of corresponding points) including the representative point and the displaced point which virtually correspond to each other between the two images. Finally, the image processing apparatus adds the plurality of generated virtual corresponding points to the evaluation function of alignment as a constraint for the alignment between the two images, and performs second deformation alignment between the two images again. The region that should be hard such as a hard lesion or a bone is thus set as the region of interest (the region whose deformation is to be suppressed), thereby estimating a deformation configured to maintain the shape of the region of interest while applying an appropriate deformation based on the evaluation function to the entire image. That is, a deformation that is consistent for the entire image can be estimated.

The arrangement and processing according to this embodiment will be described below with reference to FIGS. 1 to 7. FIG. 1 shows an image processing apparatus 100 according to this embodiment. As shown in FIG. 1, the image processing apparatus 100 is connected to a data server 110 and a display unit 120. Note that the image processing apparatus 100 may include the data server 110 and the display unit 120.

First and second images held by the data server 110 are three-dimensional tomographic images (volume data) obtained by imaging an object in advance under different conditions (different modalities, imaging modes, dates/times, and positions). The modalities that obtain the three-dimensional tomographic images may be an MRI (Magnetic Resonance Imaging) apparatus, an X-ray CT (Computed Tomography) apparatus, a three-dimensional ultrasonic imaging apparatus, a photoacoustic tomography apparatus, a PET (Positron Emission Tomography)/SPECT (Single Photon Emission Computed Tomography) apparatus, an OCT (Optical Coherence Tomography) apparatus, and the like. The first and second images may be obtained at the same time using, for example, different modalities or different imaging modes. The first and second images may be images obtained by imaging the same patient in different dates/times using the same modality and the same position for follow-up. The first and second images are input to the image processing apparatus 100 via a data obtaining unit 1010.

The display unit 120 is a liquid crystal monitor or the like, and displays various kinds of information such as a display image generated by the image processing apparatus 100. The display unit 120 also includes a GUI (Graphical User Interface) arranged to obtain an instruction from the user. The GUI functions as an operation unit in the following explanation.

The image processing apparatus 100 includes the data obtaining unit 1010, a region-of-interest obtaining unit 1020, a first deformation obtaining unit 1030, a deformation approximation unit 1040, a corresponding information generation unit 1050, a second deformation obtaining unit 1060, and a display control unit 1070.

The data obtaining unit 1010 obtains, from the data server 110, the first and second images to be input to the image processing apparatus 100. The region-of-interest obtaining unit 1020 obtains the information of a region (to be referred to as a region of interest hereinafter) on the first image, whose deformation is to be suppressed. The first deformation obtaining unit 1030 performs a first deformation alignment between the first image and the second image and obtains a first deformation displacement field to deform the first image. The deformation approximation unit 1040 approximates the first deformation displacement field in the region of interest using an approximation transformation model of a degree of freedom lower than that of the displacement field, thereby generating an approximated displacement field. The corresponding information generation unit 1050 generates, as virtual corresponding information (virtual corresponding information) between the images, the information of virtual corresponding points (approximated virtual corresponding points) on the region of interest based on the approximated displacement field. The second deformation obtaining unit 1060 performs a second deformation alignment between the first image and the second image based on an evaluation function obtained by adding a constraint based on the virtual corresponding information to an evaluation function that evaluates the degree of matching between images, and obtains a second deformation displacement field to deform the first image. The display control unit 1070 performs control to display, on the display unit 120, pieces of information such as the first image, the second image, and the tomographic image of the deformed image based on the alignment result.

FIG. 2 is a flowchart showing an overall processing procedure performed by the image processing apparatus 100.

(S2000) (Obtaining of Data)

In step S2000, the data obtaining unit 1010 obtains the first image and the second image from the data server 110. The data obtaining unit 1010 outputs the first and second images to the region-of-interest obtaining unit 1020, the first deformation obtaining unit 1030, the second deformation obtaining unit 1060, and the display control unit 1070.

FIG. 3 shows a first image 3000 and a second image 3030 of the same object. In the example of FIG. 3, the first image and the second image are images obtained by different kinds of modalities. A case in which the object is a breast of a human body is illustrated. Each image represents three-dimensional volume data such as a CT image, an MRI image, or a 3D ultrasonic image. However, since the sheet surface is two-dimensional, the image is shown in the form of a slice image cut out from volume data in a direction parallel to the X-Y plane.

In the first image 3000, an object region 3010 and a lesion region 3020 are shown. Similarly, in the second image 3030, an object region 3040 and a lesion region 3050 are shown. The lesion regions 3020 and 3050 are regions that anatomically correspond. In the example of FIG. 3, the object regions 3010 and 3040 as a breast are largely deformed between the first image and the second image. However, the lesion regions 3020 and 3050 represent an anatomically hard lesion region and therefore exhibit little deformation.

(S2010) (Obtaining of Region of Interest)

In step S2010, the region-of-interest obtaining unit 1020 obtains the information of a region of interest (the information of a lesion or the like whose deformation is to be suppressed) on each image obtained from the data obtaining unit 1010. The region-of-interest obtaining unit 1020 outputs the obtained information of the region of interest to the corresponding information generation unit 1050.

The region of interest may be a region that can hardly deform between the obtained images, for example, the region of a hard lesion, a bone region, a chest wall, or a greater pectoral muscle. If the first image and the second image are chronological images obtained in different dates/times, the region of interest may be a lesion region as the target of follow-up. The reason for this is as follows. Assume that a follow-up of the lesion region is made after deformation alignment between the chronological images to, for example, determine the treatment effect. If the lesion region is deformed as well, a change in the size of the lesion or the like caused by a time-over change cannot be observed. To solve this, even if the lesion is not rigid in actuality, the lesion region is handled as a rigid body (a region whose shape is not changed) between the images, thereby facilitating observation of the change in the size or the like.

In this embodiment, for example, the region-of-interest obtaining unit 1020 obtains, as a region of interest, the lesion region 3020 with a contour clearly extracted on the first image 3000 shown in FIG. 3. In this embodiment, the user operates an operation unit (not shown) and manually extracts the contour shape of the lesion on the image, and the region-of-interest obtaining unit 1020 thus obtains the information of the region of interest. The lesion region 3020 as the obtained region of interest is expressed as a mask image $I_{ROI}$ obtained by binarizing the inside and outside of the region of interest. Note that the region of interest can be expressed using any form capable of discriminating the inside and outside of the region of interest. The region of interest need not always be one region of interest, and a plurality of regions of interest may be obtained.

Note that the region-of-interest obtaining unit 1020 may perform the processing of obtaining the region of interest by a generally used image analysis technique. For example, the user may give, as a seed point, coordinates in the lesion region whose deformation is to be suppressed, and the region-of-interest obtaining unit 1020 may then extract a region by a region expansion method. Note that the lesion region extraction method is not limited to this, and a known region segmentation method such as a SNAKES or Level Set method may be used. Alternatively, the region-of-interest obtaining unit 1020 may perform general image processing of detecting a plurality of lesion region candidates for the first or second image. After that, the user may designate (select) a region whose deformation is to be suppressed by operating an operation unit (not shown), and the region-of-interest obtaining unit 1020 may thus obtain the region of interest.

(S2020) (Obtaining of First Deformation)

In step S2020, the first deformation obtaining unit 1030 executes first deformation alignment between the first image and the second image obtained from the data obtaining unit 1010, and obtains a first deformation displacement field. The first deformation obtaining unit 1030 outputs the obtained first deformation displacement field to the corresponding information generation unit 1050. The first deformation obtaining unit 1030 also generates a first deformed image by deforming the first image based on the first deformation displacement field, and outputs the first deformed image to the display control unit 1070.

At this time, the first deformation obtaining unit 1030 defines an evaluation function (cost function) that evaluates the adequacy of alignment by a deformation $\Phi$, and estimates the deformation $\Phi$ that minimizes the evaluation function. The deformation $\Phi$ estimated at this time will be referred to as a first deformation. The deformation $\Phi$ is expressed by a displacement field (deformation displacement field). The form of the displacement field may be a displacement vector field including a displacement vector that displaces each position on an image. Alternatively, instead of expressing the displacement field by a spatial field, it may be represented by a transformation parameter held by a predetermined transformation model capable of displacing an arbitrary position on an image.

The evaluation function defined in this step will be referred to as a first evaluation function $E1(\Phi)$. In this embodiment, as an index that constitutes the first evaluation function, the degree of matching between images by a deformation is applied. For example, an error of the positions of feature points (corresponding points) that anatomically correspond between the first image and the second image is applied. To make discrimination from virtual corresponding points to be described later, the corresponding points that actually correspond between the images will be referred to as real corresponding points. Especially, real corresponding points that anatomically correspond between images, as described above, will be referred to as landmark corresponding points. That is, the first deformation obtaining unit 1030 estimates a deformation that makes the positions of landmark corresponding points match as much as possible.

To obtain the corresponding points, the first deformation obtaining unit 1030 performs, for example, known image feature point extraction processing such as an interest operator for the first image and the second image, and extracts anatomical feature points such as blood vessel branching from each image. After that, the first deformation obtaining unit 1030 performs processing of generating sets of landmark corresponding points by associating the extracted feature points in a one-to-one correspondence. This processing is performed by setting a region of interest near each feature point on each image and associating feature points for which the image similarity of the region of interest between the images becomes high.

Note that the landmark corresponding point obtaining method is not limited to the above-described method. For example, landmark corresponding points may be obtained based on corresponding points manually input by the user, using the operation unit (not shown), to the first image and the second image displayed on the display unit 120. The first evaluation function E1(Φ) may use, as the index, not the error of real corresponding points, as described above, but, for example, the image similarity between the deformed first and second images. As the first evaluation function E1(Φ), not one of the above-described similarly of the entire image and the error of the real corresponding points but both of them may be used.

The first deformation obtaining unit 1030 optimizes the transformation parameter of a predetermined transformation model that expresses the deformation Φ so as to minimize the first evaluation function E1. An optimum deformation desirable as the alignment of the entire object in the image is thus estimated. The transformation parameter expressed by the predetermined transformation model is defined as p. In this embodiment, as the predetermined transformation model, an FFD (Free Form Deformation) in which the basis function of the deformation is represented by a B spline function is applied. The transformation parameter p in the FFD is expressed as the control amount of control points periodically arranged in the images. Note that the transformation parameter p estimated in this step will be referred to as a first transformation parameter p1. Note that the applied transformation model is not limited to the FFD. A known transformation model capable of expressing a deformation, for example, a radiation basis function such as TPS (Thin Plate Spline) or LDDMM (Large Deformation Diffeomorphic Metric Mapping) may be used.

As described above, the first deformation obtaining unit 1030 generates the transformation parameter p1 as the first deformation displacement field. Based on the generated first deformation displacement field, the first deformation obtaining unit 1030 then generates a first deformed image by deforming the first image such that it matches the second image in shape. The first deformation obtaining unit 1030 also generates a deformed image (inversely deformed image) as needed based on the first deformation displacement field by deforming the second image such that it matches the first image in shape.

(S2030) (Approximating First Deformation in Region of Interest by Approximation Transformation)

In step S2030, the corresponding information generation unit 1050 and the deformation approximation unit 1040 generate an approximated displacement field approximated by a transformation model of a degree of freedom lower than that of the first deformation displacement field in the region of interest. The corresponding information generation unit 1050 outputs the generated approximated displacement field to the second deformation obtaining unit 1060.

The transformation model used to generate the approximated displacement field (that is, the transformation model of a degree of freedom lower than that of the first deformation displacement field) will be referred to as an approximation transformation model hereinafter. For example, as the approximation transformation model, a rigid body transformation model can be applied. Since the first deformation displacement field is the result of deformation alignment of a non-rigid body, the rigid body transformation model can be considered as a model whose degree of freedom is lower than that of the first deformation displacement field. More detailed processing will be described below.

First, for each of a plurality of representative points on the region of interest, the corresponding information generation unit 1050 generates virtual corresponding points (deformed virtual corresponding points) between the images, which include the representative point and a displaced point obtained by displacing the representative point using the first deformation displacement field. The corresponding information generation unit 1050 outputs the generated deformed virtual corresponding points to the deformation approximation unit 1040.

As for the processing of the corresponding information generation unit 1050, detailed processing will be described. First, the corresponding information generation unit 1050 sets representative points on the region of interest. The region to set the representative points may be only the internal region of the region of interest or a region within a predetermined range surrounding the region of interest. For example, the region to set the representative points can be set to a region within the range of 5 mm or less around the contour of the region of interest. The corresponding information generation unit 1050 may arrange the representative points at equal intervals (for example, 0.25 mm) or at random in the region. For example, the corresponding information generation unit 1050 sets the plurality of representative points at equal intervals on the region of interest. Next, the corresponding information generation unit 1050 displaces the position of each representative point using the first deformation displacement field and calculates the position of a displaced point corresponding to each representative point. The calculated displaced point will be referred to as a deformed representative point. In this embodiment, a representative point and a deformed representative point corresponding to it are defined as virtual corresponding points between the images by the first deformation. The virtual corresponding points will be referred to as deformed virtual corresponding points hereinafter.

FIG. 4 is a schematic view showing a state in which deformed virtual corresponding points are generated based on the first deformation displacement field. FIG. 4 shows a first deformed image 4000 obtained by deforming the first image 3000 based on the first deformation displacement field. In the first deformed image 4000, an object region 4010 after the deformation and a region 4020 of interest after the deformation are shown. Representative points 4030 are representative points set on the lesion region 3020 serving as the region of interest, and deformed representative points 4040 are representative points obtained by deforming the representative points 4030 based on the first deformation field. The example of FIG. 4 shows a state in which it is estimated that the region 4020 of interest is crushed, like the object region 4010, and simultaneously, translation and rotation occur upon the first deformation alignment. At this time, the distribution of the deformed representative points 4040 is also calculated as a distribution in which the representative points 4030 are crushed as a whole, and translation and rotation occur, like the region 4020 of interest.

Next, based on the generated deformed virtual corresponding points, the deformation approximation unit 1040 generates an approximated displacement field by approximating the displacement of the deformed virtual corresponding points by an approximation transformation model. More specifically, the deformation approximation unit 1040 calculates a parameter (approximation transformation parameter) q of an approximation transformation model $\Phi'$ that minimizes a sum e of errors represented by equation (1). If a rigid body transformation model is used as the approximation transformation model, six parameters of position and orientation which define a 3×4 rigid body transformation matrix T representing the movement and rotation of an object correspond to the parameter q. That is, as represented by equation (2), the deformation approximation unit 1040 calculates the total sum e of the norms of the differences between the deformed representative points and the product of the rigid body transformation matrix and the representative points, and calculates the rigid body transformation matrix T that minimizes the total sum e under the constraint of rigid body transformation.

$$e = \sum_{i=1}^{N_D} \|\Phi'(x_{D1i} | q) - x_{D2i}\| \quad (1)$$

$$e = \sum_{i=1}^{N_D} \|T \cdot x_{D1i} - x_{D2i}\| \quad (2)$$

where $\Phi'$ (x|q) is a coordinate obtained by displacing a coordinate x by the approximation transformation model $\Phi'$ represented by the parameter q, and $(x_{D1i}, x_{D2i})$ represent the set of the coordinates of ith deformed virtual corresponding points on the first image and the second image. That is, $x_{D1i}$ is the coordinate of the ith representative point, and $x_{D2i}$ is the coordinate of the ith deformed representative point. $N_D$ is the number of deformed virtual corresponding points. Note that the matrix T can be calculated by a known method using singular value decomposition or the like, and a description of the calculation method will be omitted.

In this way, the deformation approximation unit 1040 obtains the approximated displacement field of the first deformation displacement field in the region of interest. Finally, the deformation approximation unit 1040 outputs the obtained approximation transformation parameter q to the corresponding information generation unit 1050 as the information of the approximated displacement field.

FIG. 5 is a schematic view for explaining a state in which the first deformation of the lesion region 3020 as the region of interest is approximated by rigid body transformation. Referring to FIG. 5, coordinate axes 5000 represent coordinate axes that have, as the origin, the barycentric position of the representative points (the representative points 4030 in FIG. 4) on the lesion region 3020 as the region of interest, and are parallel to the X- and Y-axes of the first image 3000. Coordinate axes 5010 represent coordinate axes after the coordinate axes 5000 are transformed using the rigid body transformation matrix T. Because of the two-dimensional sheet surface, an axis parallel to the Z-axis is not illustrated for the descriptive convenience. A plane formed by the X- and Y-axes of the coordinate axes 5010 is not necessarily parallel to a plane formed by the X- and Y-axes of the first deformed image 4000, and is schematically illustrated. As is apparent from FIG. 5, the coordinate axes 5010 match a transformation corresponding to translation/rotation components extracted from the transformation (first deformation displacement field) of the representative points 4030 shown in FIG. 4 to the deformed representative points 4040 by removing only deformation components that crush the region.

(S2040) (Generation of Approximated Virtual Corresponding information Based on Approximation Transformation)

In step S2040, the corresponding information generation unit 1050 generates a plurality of virtual corresponding points (virtual corresponding information) based on the approximated displacement field on the region of interest as virtual corresponding information between the images. In this embodiment, the virtual corresponding points will be referred to as approximated virtual corresponding points hereinafter. The generated approximated virtual corresponding points are output to the second deformation obtaining unit 1060.

Detailed processing will be described below. First, the corresponding information generation unit 1050 displaces the position of each of the plurality of representative points set on the region of interest using the approximated displacement field $\Phi'$ and calculates the position of a displaced point corresponding to each representative point, as in the process of step S2030. The calculated displaced point will be referred to as an approximated representative point. A representative point and an approximated representative point corresponding to it are defined as virtual corresponding points between the images by the approximation transformation model. The virtual corresponding points will be referred to as approximated virtual corresponding points hereinafter.

FIG. 6 is a schematic view showing a state in which approximated virtual corresponding points are generated based on the approximated displacement field. Approximated representative points 6000 are approximated representative points obtained by transforming the representative points 4030 based on the approximated displacement field. As can be seen from FIG. 6, the distribution of the approximated representative points 6000 is a distribution including only the translation and rotation represented by the transformation from the coordinate axes 5000 to the coordinate axes 5010 shown in FIG. 5 but no deformation.

(S2050) (Obtaining of Second Deformation Based on Approximated Virtual Corresponding Points)

In step S2050, the second deformation obtaining unit 1060 executes second deformation alignment between the first image and the second image using the approximated virtual corresponding points (virtual corresponding information) obtained in step S2040 as a constraint. The second deformation obtaining unit 1060 outputs a second deformation displacement field generated as the result of deformation estimation between the first image and the second image to the data server 110. The output to the data server 110 can be done using an output unit (not shown). The second deformation obtaining unit 1060 also generates a second deformed image by deforming the first image based on the second deformation displacement field and outputs it to the display control unit 1070.

At this time, the second deformation obtaining unit 1060 estimates the deformation Φ that minimizes the evaluation function used to evaluate the adequacy of the alignment by the deformation Φ, as in step S2020. The deformation Φ estimated at this time will be referred to as a second deformation. The evaluation function defined in this step will be referred to as a second evaluation function E2(Φ). In this embodiment, an evaluation function obtained by adding the error term of the corresponding point positions of the approximated virtual corresponding points to the first evaluation function E1(Φ) used in step S2020 is used as the second evaluation function.

When the error term of the corresponding point positions of the approximated virtual corresponding points by the deformation Φ is defined as R(Φ), the second evaluation function E2(Φ) is given by $$E2(\phi) = E1(\phi) + R(\phi) \quad (3)$$

$$R(\phi) = \frac{1}{N_R} \sum_{i=1}^{N_R} \|\phi(x_{R1i} \mid p2) - x_{R2i}\| \quad (4)$$

where Φ(x|p2) is a coordinate obtained by displacing the coordinate x by the second deformation Φ represented by a predetermined transformation model using a parameter p2, and ($x_{R1i}$, $x_{R2i}$) represent the set of the coordinates of ith approximated virtual corresponding points on the first image and the second image. That is, $x_{R1i}$ is the coordinate of the ith representative point, and $x_{R2i}$ is the coordinate of the ith approximated representative point. $N_R$ is the total number of approximated virtual corresponding points. That is, R(Φ) is the term that makes the representative point after the displacement by the second deformation Φ match the corresponding approximated representative point as much as possible.

The second deformation obtaining unit 1060 optimizes the transformation parameter p2 of a predetermined transformation model that expresses the deformation Φ so as to minimize the second evaluation function E2. An optimum deformation desirable as the alignment of the entire object in the image is thus estimated. In this embodiment, the same transformation model as that used in step S2020 is used as the predetermined transformation model. That is, if an FFD is applied in step S2020, the FFD is used in this step as well. Assume a case in which the transformation model is an FFD, and the second evaluation function E2(Φ) is expressed by only the error term of the real corresponding point (landmark corresponding point) positions and the error term of the approximated virtual corresponding point positions. In this case, the relationship between the parameter of the FFD and the position error between the corresponding points can be represented by a linear equation. Hence, the second deformation obtaining unit 1060 estimates the parameter p2 that minimizes the position error between the corresponding points by a known linear optimization method. The transformation parameter p2 can thus be calculated at a high speed. Similarly, when the transformation model is TPS, the second deformation obtaining unit 1060 can calculate the parameter p2 by a known linear optimization method. Note that when the similarity between images or a nonlinear regularization term is taken into consideration, or LDDMM is used as the transformation model, the second deformation obtaining unit 1060 estimates the parameter p2 by known nonlinear optimization. At this time, the second deformation obtaining unit 1060 can use the parameter p1 calculated by the first deformation obtaining unit 1030 in step S2020 as the initial value of the parameter p2. Accordingly, the parameter p2 can be calculated by a smaller number of repetitive processes.

In this way, the second deformation obtaining unit 1060 generates the transformation parameter p2 as the second deformation displacement field. Based on the generated second deformation displacement field, the second deformation obtaining unit 1060 then generates a second deformed image by deforming the first image such that it matches the second image in shape. The second deformation obtaining unit 1060 also generates a deformed image (inversely deformed image) as needed based on the second deformation displacement field by deforming the second image such that it matches the first image in shape.

As described above, in this embodiment, it is possible to estimate a deformation that keeps the region of interest in the shape (for example, a rigid body) represented by the approximation transformation model as much as possible based on the error term R(Φ) of the approximated virtual corresponding point positions while implementing appropriate alignment for the entire object based on the first evaluation function E1(Φ). In addition, since the deformation of the entire image is expressed by the single transformation model (FFD), a deformation that is consistent as a whole can be estimated.

As for the conditions of the second deformation obtained in this step, both the transformation model and the index in the evaluation function that evaluates the region other than the region of interest are the same as those of the first deformation. Hence, the deformation of the region other than the region of interest can be similar to the first deformation. Accordingly, approximation transformation components on the periphery of the region of interest in the second deformation are also similar to those in the first deformation. Hence, even if the approximation transformation components of the region of interest in the first deformation are directly applied to the deformation of the region of interest by the constraint of the approximated virtual corresponding points, the approximation transformation components almost match the periphery of the region of interest, and therefore, a consistent alignment result without any sense of discomfort can be obtained.

Figure 7:
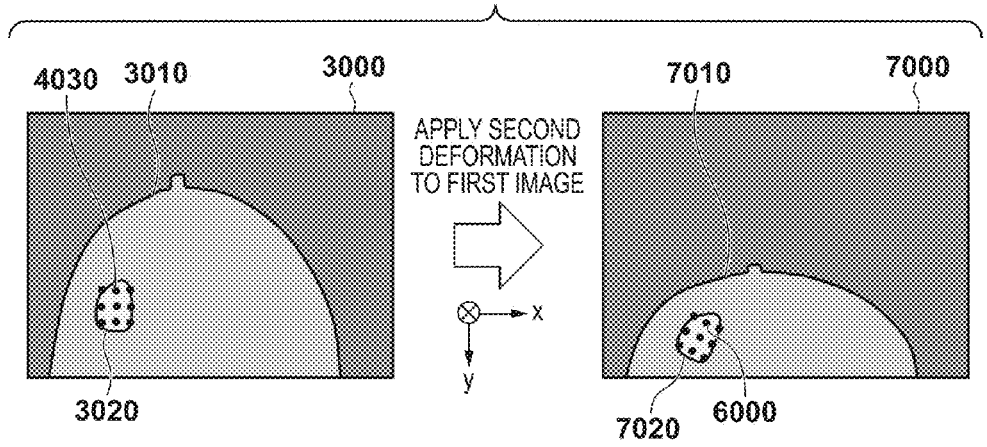
FIG. 7 is a schematic view for explaining a state in which a second deformation is applied to the first image.

FIG. 7 is a schematic view showing a state in which a second deformed image is generated by deforming the first image based on the second deformation displacement field. In a second deformed image 7000, an object region 7010 after the deformation and a region 7020 of interest after the deformation are shown. As show in FIG. 7, the object region 7010 after the deformation has almost the same shape as the object region 4010 after the deformation in FIG. 4. On the other hand, the region 7020 of interest after the deformation indicates that a crushing deformation like the region 4020 of interest after the deformation shown in FIG. 4 does not occur, and the same transformation as that of the region 4020 of interest is performed concerning only the translation and rotation while keeping the shape of the lesion region 3020 as the region of interest as a rigid body. This indicates that in the second alignment, the constraint that restricts the transformation of the region of interest to the approximation transformation model (here, a rigid body) by the error term of the positions of the approximated virtual corresponding points including the representative points 4030 and the approximated representative points 6000 exerts its effect.

(S2060) (Display of Deformed Image)

In step S2060, the display control unit 1070 performs control to display the slice images of the obtained deformed images and the second image on the display unit 120 in accordance with a user operation on the operation unit (not shown). At this time, the display control unit 1070 can be configured to display, as the deformed images, the first deformed image based on the first deformation displacement field, the second deformed image based on the second deformation displacement field, and the second image on the same slice side by side. The display control unit 1070 may control to selectively display the first deformed image and the second deformed image in one display screen region in accordance with a user operation. Note that the display control unit 1070 need not always generate or display the first deformed image. The processing of the image processing apparatus 100 according to this embodiment has been described above.

According to this embodiment, the image processing apparatus 100 estimates a deformation using a single transformation model based on an index that makes entire images appropriately match and an index that suppresses the deformation of the region of interest to a lower degree of freedom (for example, a rigid body). Accordingly, the image processing apparatus 100 can estimate a deformation consistent for the entire image by performing a transformation (for example, rigid body transformation) of a lower degree of freedom for the region of interest while appropriately deforming the region other than the region of interest in the object.

(Modification 1-1) (Approximation Transformation Model Need not Always be Rigid Body Transformation)

In the first embodiment, rigid body transformation is applied as the approximation transformation model used to approximate the deformation of the region of interest in step S2030. The approximation transformation model may be any model whose degree of freedom is lower than that of the first deformation. For example, the deformation approximation unit 1040 may approximate the first deformation by affine transformation.

More specifically, first, the corresponding information generation unit 1050 generates deformed virtual corresponding points, as in the first embodiment. Next, the deformation approximation unit 1040 generates an affine displacement field by approximating the displacement of the generated deformed virtual corresponding points by affine transformation. More specifically, the deformation approximation unit 1040 calculates the 3×4 matrix T that minimizes the sum e of errors represented by equation (2) under the constraint of affine transformation. In this equation, it is generally known that the relationship between the affine transformation matrix T and the above-described norm can be represented by a linear equation. Hence, the matrix T can be calculated by a known method such as LU decomposition or QR decomposition. The method is a known technique, and a description thereof will be omitted. Accordingly, in a case in which the region of interest is not completely a rigid body but does not deform complexly, the deformation of the region of interest can be estimated in a form close to actuality.

The deformation approximation unit 1040 may approximate the deformation of the region of interest not by simple affine transformation but by affine transformation with the constraint of volume conservation. At this time, letting $s_x$, $s_y$, and $s_z$ be scale factor components in the X, Y, and Z directions, respectively, the constraint of volume conservation is represented by $$s_x s_y s_z = 1 \quad (5)$$

That is, the deformation approximation unit 1040 can regard the problem that the parameter q is calculated in step S2030 as the problem that the parameter of the affine transformation matrix T that minimizes the evaluation function e of equation (2) is estimated under the condition to meet expression (5). The matrix T can be calculated using a known nonlinear optimization method. Accordingly, for example, in a case in which the region of interest does not deform complexly, and no compression/expansion occurs in the process of deformation, the deformation of the region of interest can be estimated in a form close to actuality.

(Modification 1-2) (Constraint May Planarly Restrict Approximated Virtual Corresponding Points)

In the first embodiment, a constraint that makes the positions of the corresponding points that form the approximated virtual corresponding points match is applied to the in second evaluation function $E2(\Phi)$ in step S2050. However, the constraint added to the second evaluation function $E2(\Phi)$ is not always limited to this.

For example, if the region of interest is a planar region such as a chest wall or a greater pectoral muscle surface, a constraint that restricts the approximated virtual corresponding points on the surface of the region of interest (the approximated virtual corresponding points need only exist on the surface, and the positions need not match) may be applied to the second evaluation function $E2(\Phi)$. This is expected to exert the effect in the following case.

For example, in a deformation that presses a breast, if an external force is applied to the breast, the mammary and fat tissues in the breast are known to deform while sliding on the greater pectoral muscle surface in a deeper place. At this time, since the greater pectoral muscle surface hardly deforms, it is assumed that the greater pectoral muscle surface is set as the region of interest, and a deformation to maintain the greater pectoral muscle surface as a rigid body is performed. At this time, in step S2050, if a constraint that makes the approximated virtual corresponding point positions themselves match is applied to the second evaluation function $E2(\Phi)$, the tissues near the greater pectoral muscle are restricted to positions on the greater pectoral muscle surface, and a deformation sliding on the greater pectoral muscle surface is not obtained. In this modification, a condition to restrict the approximated virtual corresponding points only on the surface of the region of interest (greater pectoral muscle surface) is added to the second evaluation function $E2(\Phi)$. This allows the approximated virtual corresponding points to slide on the surface of the region of interest. That is, a representative point set on the region of interest including the outer surface of the region of interest is allowed to move along the surface of the region of interest even after the deformation by the approximated displacement field. This makes it possible to allow the tissues near the greater pectoral muscle to slide on the greater pectoral muscle surface.

A detailed method will be described below. Assume that the representative points that form the approximated virtual corresponding points are uniformly arranged on the region of interest that is a planar region. At this time, in step S2050, the constraint that restricts the approximated virtual corresponding points on the surface of the region of interest is represented by the function $R(\Phi)$ included in the second evaluation function $E2(\Phi)$, which is given by $$R(\phi) = \frac{1}{N_R} \sum_{i=1}^{N_R} \|Cov^{-1}(x_{R2i})(\phi(x_{R1i} \mid p2) - x_{R2i})\|^2 \qquad (6)$$

where the same symbols as in equation (4) have the same meanings as in equation (4). Cov(x) is the function of returning a covariance matrix concerning a three-dimensional error at the position x. The covariance Cov(x) will be abbreviated as Cov hereinafter.

In this modification, the covariance Cov can be, for example, a function of returning a covariance representing a Gaussian distribution that is narrow in the normal direction near the ith approximated representative point $x_{R2i}$ but very wide in the direction of a plane orthogonal to the normal direction. The normal direction near the approximated representative point $x_{R2i}$ means the direction of the normal vector of a plane spanned by a set of approximated representative points near the approximated representative point $x_{R2i}$ out of the planarly distributed approximated representative points. The normal vector can be calculated by, for example, performing principal component analysis as a known method for the positions of the set of the approximated representative points near the approximated representative point $x_{R2i}$ and obtaining a third principal component vector.

Note that the normal vector calculation method is not limited to this, and any known method is usable. In equation (6), a three-dimensional vector representing the error between a representative point after the displacement by the second deformation Φ and a corresponding approximated representative point is defined as e. By equation (6), if the normal component in the input vector is large, the product of $Cov^{-1}$ and the error vector e returns a large value. If another component is large, the product returns a very small value. Hence, by equation (6), R(Φ) can impose a penalty to only the component in the normal direction of the approximated representative points in the error e between the representative point after the displacement by the second deformation Φ and the corresponding approximated representative point. That is, R(Φ) functions as a term to prevent the representative point after the displacement from shifting from the corresponding approximated representative point only in the normal direction.

The transformation parameter p2 that minimizes the thus defined evaluation function E2(Φ) can be calculated by a known nonlinear optimization method as in step S2050. The parameter p2 can also be calculated by a linear optimization method based on the covariance Cov, which is described in K. Rohr, H. S. Stiehl, R. Sprengel, T. M. Buzug, J. Weese, and M. H. Kuhn, "Landmark-Based Elastic Registration Using Approximating Thin-Plate Splines", IEEE Transactions on Medical Imaging, Vol. 20, No. 6, June 2001.

(Modification 1-3)

In the first embodiment, the virtual corresponding points are applied as the virtual corresponding information between the images used in steps S2040 and S2050. However, the virtual corresponding information to be used need not always be the corresponding points.

For example, virtual corresponding information between the images in the information about the shape of the region of interest may be used as the virtual corresponding information. More specifically, in step S2040, the corresponding information generation unit 1050 displaces the region of interest itself using the approximated displacement field Φ', thereby obtaining the corresponding region of interest (approximated region of interest) after the displacement. More specifically, the corresponding information generation unit 1050 displaces the mask image $I_{ROI}$ representing the region of interest using the approximated displacement field Φ', thereby obtaining a mask image $I_{A\_ROI}$ of the approximated region of interest. The corresponding information generation unit 1050 then generates the region of interest and the approximate region of interest as virtual corresponding regions between the images by the approximation transformation model. The information of the virtual corresponding regions holds the information of the contour shape of the region of interest. Hence, this will be referred to as an approximated virtual corresponding shape as the virtual corresponding information between the images according to this modification.

The corresponding information generation unit 1050 outputs the generated approximated virtual corresponding shape to the second deformation obtaining unit 1060. In step S2050, the second deformation obtaining unit 1060 executes the second deformation alignment between the first image and the second image using the approximated virtual corresponding shape obtained in step S2040 as a constraint. At this time, in this modification, an error term R'(Φ) of the approximated virtual corresponding shape is applied to the second evaluation function E2(Φ) to be minimized in this step in place of the error term R(Φ) of the corresponding point positions of the approximated virtual corresponding points in the first embodiment. The error term R'(Φ) of the approximated virtual corresponding shape is given by $$R'(\phi) = S(\phi(I_{ROI}), I_{A\_ROI}) \qquad (7)$$

where $S(I_1, I_2)$ represents an image similarity function between an image $I_1$ and an image $I_2$. As a rule to calculate the image similarity, a generally used known method such as SSD (Sum of Squared Difference), mutual information, or a cross correlation function is used. This makes it possible to estimate the deformation Φ such that the mask image $I_{ROI}$ of the region of interest as the approximated virtual corresponding shape matches the mask image $I_{A\_ROI}$ of the approximated region of interest as much as possible. That is, it is possible to estimate a deformation that keeps the contour shape of the region of interest in a shape represented by the approximation transformation model.

Alternatively, the following information may be applied as the virtual corresponding information. First, the corresponding information generation unit 1050 generates a distance field from the contour position of the region of interest in each of the mask image $I_{ROI}$ of the region of interest and the mask image $I_{A\_ROI}$ of the approximated region of interest. Next, the corresponding information generation unit 1050 transforms each distance value in each distance field into a luminance value, thereby generating a visualized distance field image. The distance field image corresponding to $I_{ROI}$ is defined as $I_{DIST}$, and the distance field image corresponding to $I_{A\_ROI}$ is defined as $I_{A\_DIST}$. These distance field images are used as the virtual corresponding information between the images by the approximation transformation model. In this case, $I_{DIST}$ and $I_{A\_DIST}$ are applied to equation (6) in place of $I_{ROI}$ and $I_{A\_ROI}$, thereby obtaining similar luminance information not only on the contour of the region of interest but also inside the region of interest. It is therefore possible to estimate a deformation that keeps the shape of the region $I_{ROI}$ of interest, including the inside of the region of interest, in a shape represented by the approximation transformation model.

(Modification 1-4)

In the first embodiment, the deformed virtual corresponding points generated in step S2030 and the approximated virtual corresponding points generated in step S2040 are generated from the same representative points on the first image. However, they need not always be generated from the same representative points. The deformed virtual corresponding points and the approximated virtual corresponding points may be generated from different representative points. For example, a method may be employed which generates the deformed virtual corresponding points from representative points set on a region within a predetermined range surrounding the region of interest (5 mm or less around the region of interest), and generates the approximated virtual corresponding points from representative points strictly set on the region of interest. This makes it possible to give, in the second deformation, a constraint that can extract approximation transformation components more consistent with the region on the periphery of the region of interest and maintain the shape strictly only for the region of interest.

(Modification 1-5) ($E1(\Phi)$ Need not Same in First Deformation Estimation and Second Deformation Estimation)

In the first embodiment, the second evaluation function $E2(\Phi)$ in step S2050 uses the first evaluation function $E1(\Phi)$, as indicated by equation (3). However, the first evaluation function $E1(\Phi)$ need not always be used in step S2050. For example, in step S2050, an evaluation function that performs accurate evaluation and needs a higher calculation cost may be used as $E1(\Phi)$. For example, the error of the landmark corresponding point positions can be used as $E1(\Phi)$ in the first deformation estimation, and the image similarity of the entire image can be used as $E1(\Phi)$ in the second deformation estimation. This is because the first deformation estimation is merely intermediate processing for obtaining the approximated displacement field, but the second deformation estimation aims at obtaining the result of alignment.

(Modification 1-6) (Second Deformation Need not Use Same Transformation Model as in First Deformation)

In the first embodiment, the second deformation in step S2050 uses the same transformation model as in the first deformation in step S2020. However, if the approximation transformation component on the periphery of the region of interest results similarly to the first deformation, the transformation model used in the second deformation need not always match that in step S2020.

For example, in this embodiment, an FFD is employed as the transformation model in step S2020. However, an FFD in which the control point interval that is one of the parameters of the FFD model is changed may be employed in step S2050. More specifically, if the control points are arranged at an interval of 20 mm in step S2020, the control points may be arranged at a half interval of 10 mm in step S2050. This can increase the degree of freedom of deformation without changing the characteristic of obtaining a smooth deformation by a B spline basis function. That is, a more detailed deformation can be expressed. Additionally, to attain similarity of the general deformation of the entire image between the first deformation and the second deformation, for example, a transformation model that increases the degree of freedom of deformation stepwise is applied in the second deformation. More specifically, a multi-resolution FFD that is a known technique of sequentially applying an FFD of a low degree of freedom of deformation expressed by "coarse control points (at an interval of 20 mm)" as in the first deformation and an FFD of a high degree of freedom of deformation expressed by "fine control points (at an interval of 10 mm)" is applied as the transformation model.

Accordingly, in the second deformation, detailed alignment more than that in the first deformation is implemented, and simultaneously, the state of the first deformation is held as the general deformation. Hence, the approximation transformation component on the periphery of the region of interest is similar to that in the first deformation. If the approximation transformation component on the periphery of the region of interest does not largely change, transformation models of different characteristics, for example, an FFD and a TPS, or an FFD and an LDDMM may be applied as the combination of the first deformation and the second deformation. If the error term $R(\Phi)$ of the virtual corresponding point positions is used as part of the evaluation function $E2(\Phi)$ of the second deformation, any transformation model or evaluation function may be used.

Second Embodiment

In the first embodiment, the first deformation of the region of interest is approximated using a predetermined approximation transformation model. However, the approximation transformation model may adaptively be selected in accordance with the characteristic of the region of interest. An image processing apparatus according to this embodiment selects an appropriate approximation transformation model in accordance with the type of a part (an organ or a lesion) corresponding to a region of interest, and approximates the first deformation of the region of interest using the selected approximation transformation model. This can prevent the alignment accuracy from lowering because of use of a predetermined approximation transformation model and application of the approximation transformation model originally having a characteristic different from the deformation of the region of interest. Concerning the image processing apparatus according to this embodiment, points different from the first embodiment will be described below.

Figure 8:
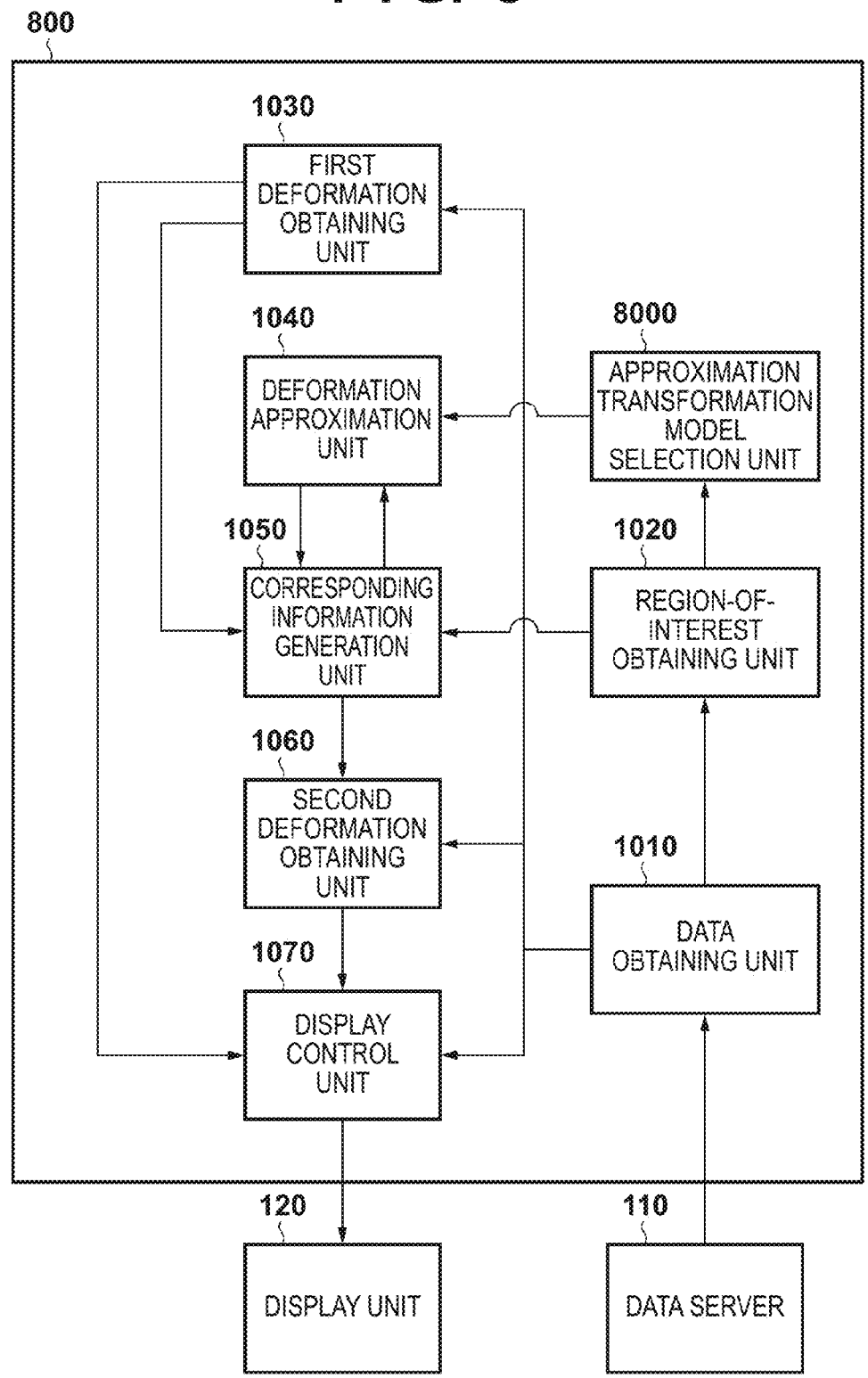
FIG. 8 is a block diagram showing the arrangement of an image processing apparatus according to the second embodiment.

FIG. 8 shows the arrangement of an image processing apparatus 800 according to this embodiment. Referring to FIG. 8, the arrangement is the same as that of the image processing apparatus 100 (FIG. 1) according to the first embodiment except that an approximation transformation model selection unit 8000 is newly added. The functions of a region-of-interest obtaining unit 1020 and a deformation approximation unit 1040 are different from those in the first embodiment, and a description thereof will be made below. The functions of the remaining components are the same as in the first embodiment, and a description of the same functions will be omitted.

The region-of-interest obtaining unit 1020 obtains a region of interest from the first image, and classifies (identifies) the type of a portion corresponding to the region of interest. The approximation transformation model selection unit 8000 selects an approximation transformation model appropriate for the deformation expression of the portion in accordance with the classified (identified) type. The deformation approximation unit 1040 approximates the first deformation displacement field in the region of interest using the selected approximation transformation model, thereby generating an approximated displacement field.

Figure 9:
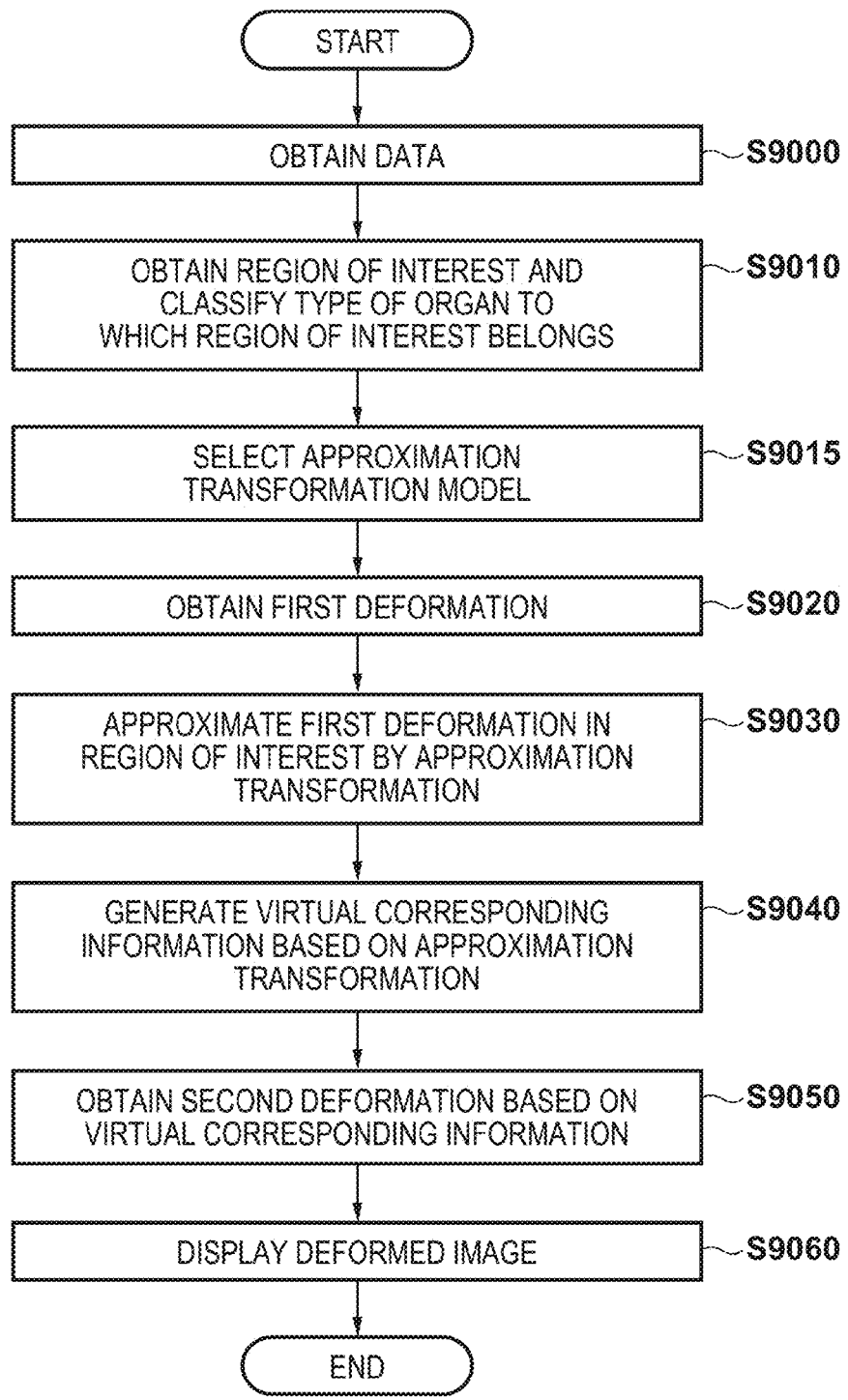
FIG. 9 is a flowchart showing an overall processing procedure according to the second embodiment.

FIG. 9 is a flowchart showing an overall processing procedure performed by the image processing apparatus 800. The processes of steps S9000, S9020, and S9040 to S9060 of this flowchart are the same as the processes of steps S2000, S2020, and S2040 to S2060 shown in FIG. 2, and a description thereof will be omitted. Only points different from the flowchart of FIG. 2 will be described below.

(S9010) (Obtaining of Region of Interest and Classification of Type of Corresponding Portion)

In step S9010, the region-of-interest obtaining unit 1020 obtains information representing a region of interest whose deformation is to be suppressed on an image obtained from a data obtaining unit 1010, and classifies (identifies) the type of a portion corresponding to the region of interest. The obtained region of interest and its classification information are output to the approximation transformation model selection unit 8000.

Detailed processing of this step will be described. For example, consider a case in which the region of interest is an organ. The region-of-interest obtaining unit 1020 extracts an organ region from the first image and classifies the type of a corresponding organ by known image analysis processing such as fitting of a statistical atlas for each organ type. The region-of-interest obtaining unit 1020 obtains a region of interest based on the extracted/classified organ region. At least one region of the extracted organ region is set as the region of interest. The region may be set by inputting a designation of a region on the image by the user. Alternatively, a region corresponding to the type of an organ (for example, a bone or a liver) for which a predetermined deformation should be approximated may be set from the extracted organ region. Note that if a plurality of regions of interest exist, the region-of-interest obtaining unit 1020 executes these processes for each region of interest.

Note that the region-of-interest obtaining unit 1020 may classify the organ region based on information described in the clinical information of the object stored in a data server. For example, if the obtained image is an abdominal contrast CT image, the organ included in the image is a liver or spleen region. Hence, the region-of-interest obtaining unit 1020 can narrow down the organ types. For example, if the volume of the extracted region is large, the region-of-interest obtaining unit 1020 can classify it as a liver. If the volume of the region is small, the region-of-interest obtaining unit 1020 can classify it as a spleen.

If the region of interest is a lesion, and finding information is described as information added to the first image, the region-of-interest obtaining unit 1020 may obtain the classification information of the lesion based on the finding information. For example, if "hard cancer", "benign tumor", "DCIS", or similar information is described, the region-of-interest obtaining unit 1020 can set the information as the classification information of the portion. If they are not described, the region-of-interest obtaining unit 1020 can define classification information as "unknown".

(S9015) (Selection of Approximation Transformation Model)

In step S9015, the approximation transformation model selection unit 8000 selects a type of an approximation transformation model in accordance with the type or characteristic of the organ corresponding to the region of interest. For example, the approximation transformation model selection unit 8000 can apply a rigid body transformation model to a region classified to a bone and an affine transformation model of volume conservation to a region classified to a liver. Note that if a plurality of regions of interest exist, the approximation transformation model selection unit 8000 executes these processes for each region of interest. The approximation transformation model selection unit 8000 can apply a rigid body transformation model to "hard cancer", an affine transformation model of volume conservation to "benign tumor", and "no approximation" to "DCIS" or "unknown". Note that the approximation transformation model selection unit 8000 can exclude a region of interest to which "no approximation" is applied from the processing target that should undergo subsequent approximation processing. The approximation transformation model selection unit 8000 outputs the selected approximation transformation model type to a corresponding information generation unit 1050.

(S9030) (Approximating First Deformation in Region of Interest by Approximation Transformation)

In step S9030, the deformation approximation unit 1040 generates an approximated displacement field obtained by approximating the first deformation displacement field in the region of interest by the approximation transformation model obtained from the approximation transformation model selection unit 8000 and having a degree of freedom lower than that of the displacement field. The deformation approximation unit 1040 outputs the generated approximated displacement field to a corresponding information generation unit 1050.

The process of this step is different from step S2030 of the first embodiment only in the following point. That is, in step S2030 of the first embodiment, the deformation approximation unit 1040 uses a predetermined approximation transformation model. In this step, however, the deformation approximation unit 1040 uses the approximation transformation model obtained from the approximation transformation model selection unit 8000. The rest is the same as in the process of step S2030, and a detailed description thereof will be omitted. Note that if a plurality of regions of interest exist, the deformation approximation unit 1040 executes these processes for each region of interest. The processing of the image processing apparatus 800 is thus executed.

As described above, the image processing apparatus according to this embodiment selects an appropriate approximation transformation model in accordance with the type of the organ corresponding to the region of interest, and approximates the first deformation of the region of interest using the selected approximation transformation model. This can prevent the alignment accuracy from lowering because of use of a predetermined approximation transformation model and application of the approximation transformation model originally having a characteristic different from the deformation of the region of interest.

Third Embodiment

In the first embodiment, virtual corresponding information obtained by approximating the first deformation of the region of interest by approximation transformation of a low degree of freedom is directly used as the alignment index of second deformation alignment. However, the virtual corresponding information obtained by approximation transformation need not always be directly used as the alignment index of second deformation alignment. In this embodiment, intermediate corresponding information located between virtual corresponding information obtained from a first deformation and virtual corresponding information obtained from approximation transformation is used as the alignment index of second deformation alignment. Concerning an image processing apparatus according to this embodiment, points different from the first embodiment will be described below.

Figure 10:
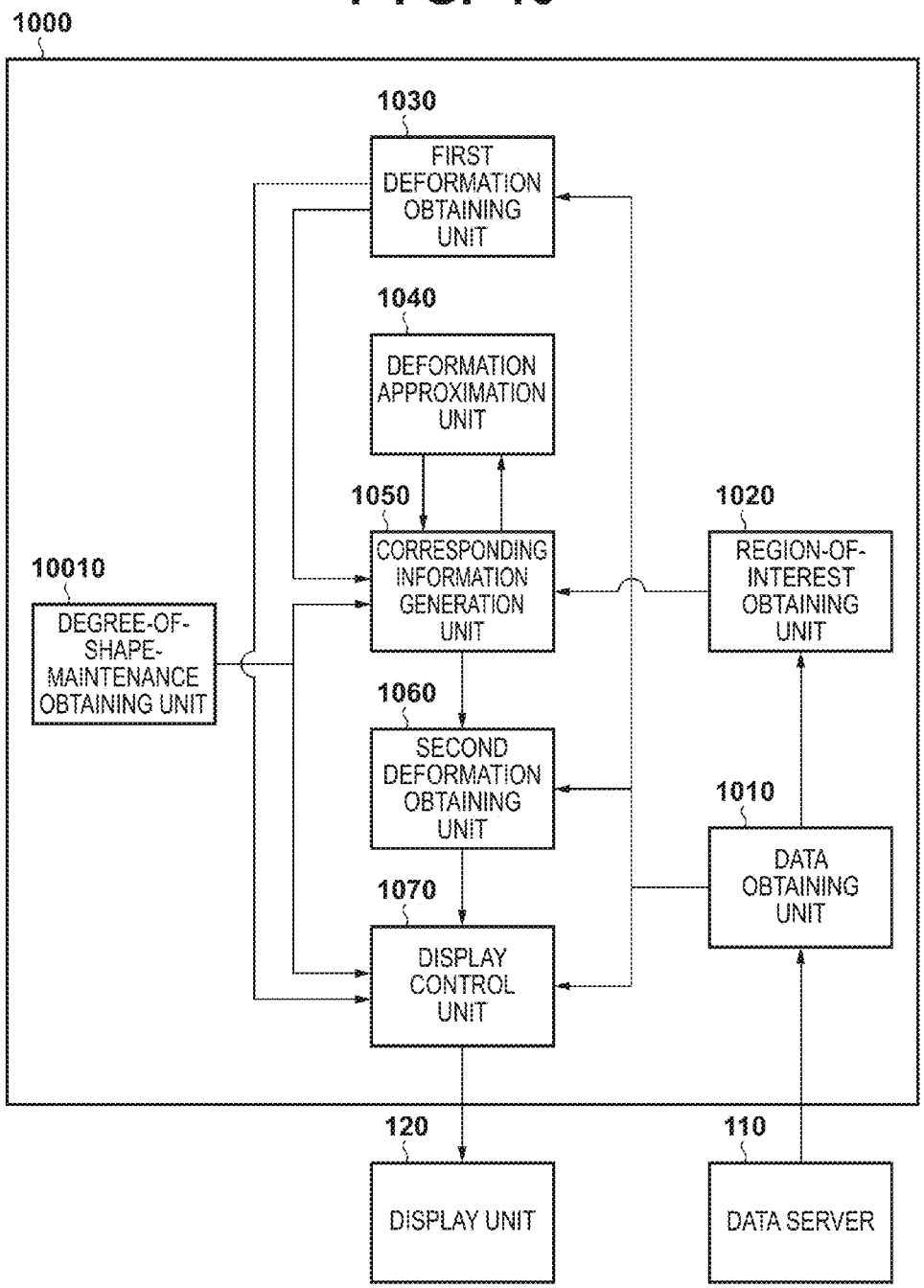
FIG. 10 is a block diagram showing the arrangement of an image processing apparatus according to the third embodiment.

FIG. 10 shows the arrangement of an image processing apparatus 1000 according to this embodiment. Referring to FIG. 10, the arrangement is the same as that of the image processing apparatus 100 according to the first embodiment except that a degree-of-shape-maintenance obtaining unit 10010 is newly added. However, the functions of a corresponding information generation unit 1050, a second deformation obtaining unit 1060, and a display control unit 1070 are different from those in the first embodiment, and a description thereof will be made below. The functions of the remaining components are the same as in the first embodiment, and a description of the same functions will be omitted.

In accordance with a user input from an operation unit (not shown), the degree-of-shape-maintenance obtaining unit 10010 obtains the value of a degree of shape maintenance representing how much a region of interest should maintain its shape in deformation alignment. In other words, the degree of shape maintenance is an index representing the degree of change from the first deformation displacement field to the second deformation displacement field concerning the region of interest. In addition to the function of generating deformed virtual corresponding points and approximated virtual corresponding points, as in the first embodiment, the corresponding information generation unit 1050 generates virtual corresponding points located between the deformed virtual corresponding points and the approximated virtual corresponding points based on the degree of shape maintenance obtained from the degree-of-shape-maintenance obtaining unit 10010. The virtual corresponding points will be referred to as intermediate virtual corresponding points. The second deformation obtaining unit 1060 replaces the deformation alignment processing of the first embodiment, which is performed based on the approximated virtual corresponding points, with processing based on not only the approximated virtual corresponding points but either of the approximated virtual corresponding points and the intermediate virtual corresponding points. The remaining functions are the same as in the first embodiment, and a detailed description thereof will be omitted. In addition to the same function as in the first embodiment, the display control unit 1070 obtains, from the operation unit (not shown), a user instruction concerning whether to end the processing, and upon obtaining an instruction "to end", ends the processing. Upon obtaining an instruction "not to end", the display control unit 1070 maintains a state to wait for a user input.

Figure 11:
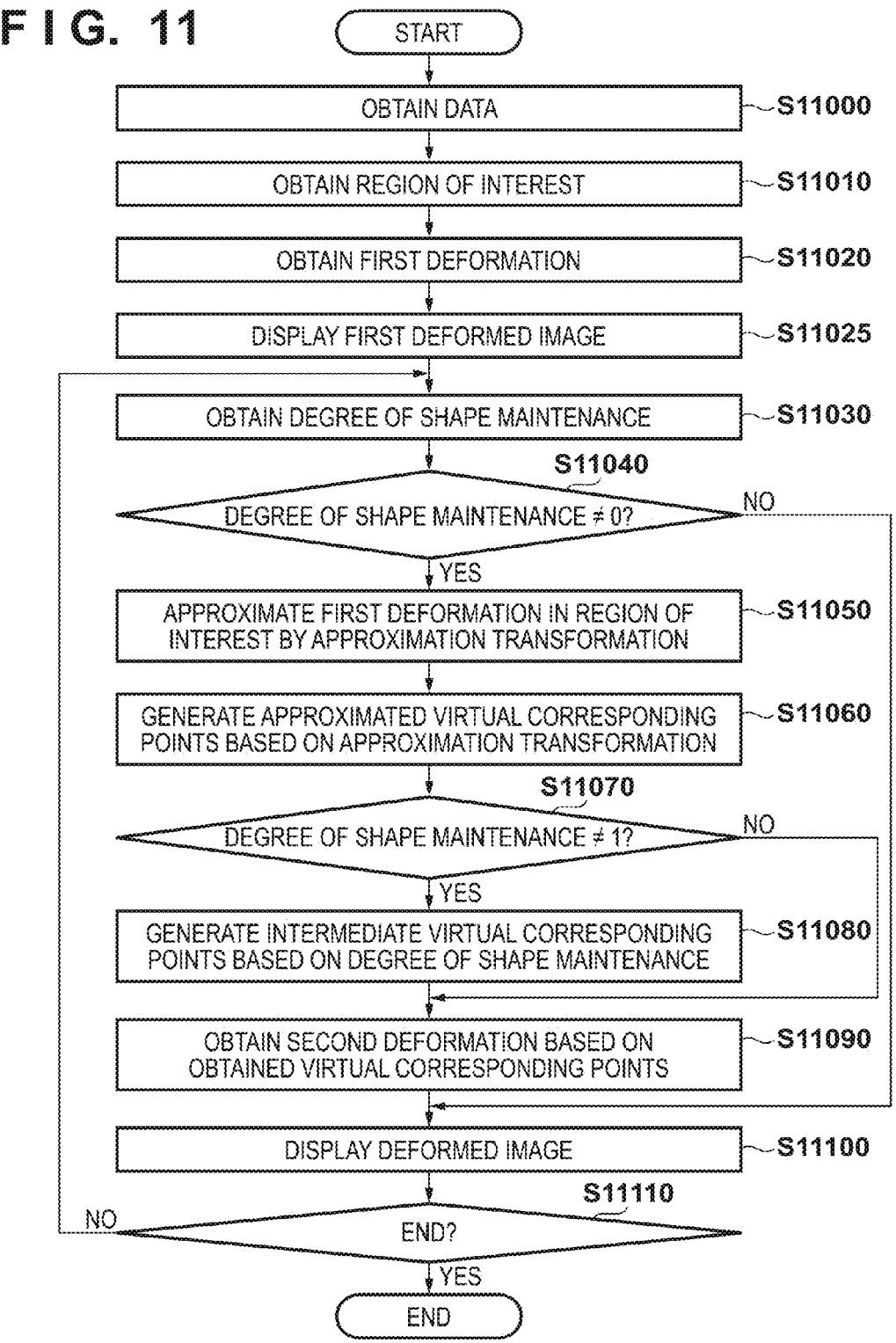
FIG. 11 is a flowchart showing an overall processing procedure according to the third embodiment.

FIG. 11 is a flowchart showing an overall processing procedure performed by the image processing apparatus 1000. The processes of steps S11000 to S11020, S11050, S11060, and S11100 of this flowchart are the same as the processes of steps S2000 to S2020, S2030, S2040, and S2060 of the flowchart shown in FIG. 2, and a description thereof will be omitted. Note that in this embodiment, virtual corresponding information is an approximated virtual corresponding point as described in the first embodiment. Points different from the flowchart of FIG. 2 will be described below.

(S11025) (Display of First Deformed Image)

In step S11025, the display control unit 1070 performs control to display the slice images of an obtained first deformed image and the second image on a display unit 120 in accordance with a user operation on the operation unit (not shown). At this time, the display control unit 1070 can control to display the first deformed image and the second image on the same slice side by side on the display unit 120.

(S11030) (Obtaining of Degree of Shape Maintenance)

In step S11030, the degree-of-shape-maintenance obtaining unit 10010 obtains a degree of shape maintenance input from the operation unit (not shown) by the user. The value of the obtained degree of shape maintenance is output to the corresponding information generation unit 1050 and the display control unit 1070.

The value of the degree of shape maintenance will be represented by $\lambda_R$ below. Based on the value $\lambda_R$ of the degree of shape maintenance obtained in this step, second deformation alignment in step S11090 is executed. The value $\lambda_R$ of the degree of shape maintenance meets a range $0 \leq \lambda_R \leq 1$. As $\lambda_R$ approaches 0, the intermediate virtual corresponding point moves close to the position of the deformed virtual corresponding point, and the deformation of the region of interest approaches the same deformation as the periphery. That is, the region of interest approaches the same state as the periphery in which it readily deforms without any particular constraint. On the other hand, as $\lambda_R$ approaches 1, the position of the intermediate virtual corresponding point moves close to the position of the approximated virtual corresponding point, and the deformation of the region of interest approaches the approximation transformation. That is, the region of interest approaches a state in which it hardly deforms, unlike the periphery.

The degree-of-shape-maintenance obtaining unit 10010 can obtain $\lambda_R$ by, for example, making the user select one of a plurality of predetermined values. For example, consider a case in which a list (for example, {0, 0.25, 0.5, 0.75, 1.0}) of a plurality of preset values $\lambda_R$ is displayed on the display unit 120. In this case, if the user selects a value (for example, 0.5) in the list via the operation unit (not shown), the degree-of-shape-maintenance obtaining unit 10010 obtains the selected value as $\lambda_R$.

Note that the degree-of-shape-maintenance obtaining method is not limited to this, and any method is usable. For example, the user may directly input a value via the operation unit (not shown), and the degree-of-shape-maintenance obtaining unit 10010 may obtain the value. In this case, for example, if the user inputs a value "1.0", the degree-of-shape-maintenance obtaining unit 10010 obtains $\lambda_R=1.0$.

Alternatively, in step S11030, the user can observe the first deformed image and the second image displayed on the display unit 120 and input the value of the degree of shape maintenance determined based on the result. For example, if the region of interest on the first deformed image displayed on the display unit 120 is close to the corresponding region on the second image to some extent, the user can set a low degree of shape maintenance by determining that the deformation of the region of interest can be expressed by the transformation model of the first deformation correctly to some extent. On the other hand, if the shapes are largely different, the user can set a high degree of shape maintenance by determining that the deformation of the region of interest is far apart from the transformation model of the first deformation.

As described above, the image processing apparatus 1000 according to this embodiment can adjust the difficulty of the deformation of the region of interest in accordance with the degree of shape maintenance. For example, if rigid body transformation is applied as the approximation transformation model, the image processing apparatus 1000 can adjust the approximate hardness of the region of interest based on the degree of shape maintenance. For example, the user may select a degree of qualitative hardness on a correspondence table between the "degree" of qualitative hardness and the value "$\lambda_R$" of the degree of shape maintenance, which is created in advance. The degree-of-shape-maintenance obtaining unit 10010 may obtain the selected "degree" and $\lambda_R$ corresponding to it. More specifically, assume that a correspondence table for mapping, for example, "soft"=0.0, "slightly soft"=0.25, "medium"=0.25, "slightly hard"=0.75, and "hard"=1.0 is held in the image processing apparatus 1000 in advance. The display control unit 1070 displays a list of degrees of qualitative hardness (for example, {"soft", "slightly soft", "medium", "slightly hard", and "hard"}) on the display unit 120. If the user selects a degree (for example, "hard") via the operation unit (not shown), the degree-of-shape-maintenance obtaining unit 10010 can obtain a value (for example, 1.0) corresponding to the degree as $\lambda_R$ by looking up the correspondence table.

Note that the method of obtaining the degree $\lambda_R$ of shape maintenance is not limited to the method by manual input of the user. For example, the degree-of-shape-maintenance obtaining unit 10010 may obtain, as $\lambda_R$, a predetermined value stored in a storage unit (not shown) in the image processing apparatus 1000 in advance. The degree-of-shape-maintenance obtaining unit 10010 may obtain $\lambda_R$ based on the clinical information of the object stored in a data server 110.

For example, if a finding or diagnosis meaning "the lesion is hard", "hard cancer", "calcification", or the like is described in clinical information such as an interpretation report, the degree-of-shape-maintenance obtaining unit 10010 sets $\lambda_R$=1.0. Similarly, if a finding or diagnosis meaning "the lesion is soft like the peripheral tissue" or "noninfiltrating cancer" is described in clinical information, the degree-of-shape-maintenance obtaining unit 10010 sets $\lambda_R$=0.0. An analysis unit (not shown) may determine the degree of qualitative hardness of the region of interest by analyzing the image feature of the region corresponding to the region of interest on the first image, and based on this, the degree-of-shape-maintenance obtaining unit 10010 may obtain $\lambda_R$ by the above-described mapping. A region-of-interest obtaining unit 1020 may extract an organ region from the first image by the same method as in step S9010 of FIG. 9 described in the second embodiment, and the degree-of-shape-maintenance obtaining unit 10010 may set a predetermined value of the degree of shape maintenance for each organ. For example, the degree-of-shape-maintenance obtaining unit 10010 can perform processing of setting $\lambda_R$=1.0 for a region classified to a bone and $\lambda_R$=0.75 for a region classified to a liver or lung.

(S11040) (Determining Whether Degree of Shape Maintenance is 0)

In step S11040, the degree-of-shape-maintenance obtaining unit 10010 determines whether the value $\lambda_R$ of the degree of shape maintenance is 0. If $\lambda_R \neq 0$, the process advances to step S11050. On the other hand, if $\lambda_R$=0, the process advances to step S11100. Accordingly, if the degree $\lambda_R$ of shape maintenance has a value other than 0, the image processing apparatus 1000 can obtain, as the final alignment result, the second deformed image in which the shape of the region of interest is maintained based on the value $\lambda_R$ of the degree of shape maintenance by the processes of steps S11050 to S11090. On the other hand, if $\lambda_R$ is 0, the shape of the region of interest need not be maintained. Hence, the image processing apparatus 1000 can obtain the first deformed image generated in step S11020 directly as the final alignment result. It is therefore possible to omit the processing of unnecessarily generating the second image and improve the efficiency of the overall processing procedure.

(S11070) (Determining Whether Degree of Shape Maintenance is 1)

In step S11070, the degree-of-shape-maintenance obtaining unit 10010 determines whether the value $\lambda_R$ of the degree of shape maintenance is 1. If $\lambda_R \neq 1$, the process advances to step S11080. On the other hand, if $\lambda_R$=1, the process advances to step S11090. Accordingly, if $\lambda_R$ has a value other than 1, the image processing apparatus 1000 can generate intermediate virtual corresponding points by the process of step S11080, and obtain, as the final alignment result, the second deformed image for which the alignment is performed by applying the intermediate virtual corresponding points to the error term of the virtual corresponding point positions in step S11090. On the other hand, if $\lambda_R$ is 1, the image processing apparatus 1000 can obtain, as the final alignment result, the second deformed image for which the alignment is performed by applying the approximated virtual corresponding points generated in step S11060 directly to the error term of the virtual corresponding point positions in step S11090. It is therefore possible to omit the processing of unnecessarily generating the intermediate virtual corresponding points and improve the efficiency of the overall processing procedure.

(S11080) (Generating Intermediate Virtual Corresponding Points Based on Degree of Shape Maintenance)

In step S11080, the corresponding information generation unit 1050 generates intermediate virtual corresponding points located between the deformed virtual corresponding points and the approximated virtual corresponding points on a region $D_{ROI}$ of interest based on the value $\lambda_R$ of the degree of shape maintenance obtained from the degree-of-shape-maintenance obtaining unit 10010. The corresponding information generation unit 1050 outputs the generated intermediate virtual corresponding points to the second deformation obtaining unit 1060.

If $\lambda_R$ is close to 0, the position of the intermediate virtual corresponding point approaches the deformed virtual corresponding point. If $\lambda_R$ is close to 1, the position of the intermediate virtual corresponding point approaches the approximated virtual corresponding point. The approximated virtual corresponding points restrict the deformation of the region of interest such that it conforms to the approximation transformation model. On the other hand, the intermediate virtual corresponding points have such a characteristic feature that maintains the deformation of the region of interest in a state between a state in which the deformation of the region of interest is the same as the deformation of the periphery and a state in which the region of interest conforms to the approximation transformation model. A detailed generation method of the intermediate virtual corresponding points will be described below.

First, the corresponding information generation unit 1050 generates representative points located between representative points that are obtained by transforming representative points on the first image and constitute deformed virtual corresponding points and approximated virtual corresponding points, that is, deformed representative points and approximated virtual representative points. The generated representative points will be referred to as intermediate representative points. Next, the corresponding information generation unit 1050 generates, as intermediate virtual corresponding points, virtual corresponding points between the images from the representative points and the intermediate representative points corresponding to them.

As a detailed generation method of the intermediate representative points, the following method is employed in this embodiment. The ith deformed representative point and the ith approximated representative point will be defined as $P_{Di}$ and $P_{Ri}$, respectively. The coordinates of the points $P_{Di}$ and $P_{Ri}$ are represented by $x_{D2i}$ and $x_{R2i}$, respectively, as described above, and i meets $1 \leq i \leq N_D = N_R$. At this time, an ith intermediate representative point $P_{Mi}$ is calculated as a position which is located on a line segment $P_{Di}P_{Ri}$ connecting $P_{Di}$ and $P_{Ri}$ and whose distance from the point $P_{Di}$ has the ratio $\lambda_R$ with respect to the length of the line segment $P_{Di}P_{Ri}$. That is, letting $x_{M2i}$ be the coordinate of the point $P_{Mi}$, $x_{M2i}$ is given by $$x_{M2i} = x_{D2i} + \lambda_R(x_{R2i} - x_{D2i}) \quad (8)$$

The point located between the deformed representative point and the approximated representative point can thus be obtained as the intermediate representative point.

Figure 12:
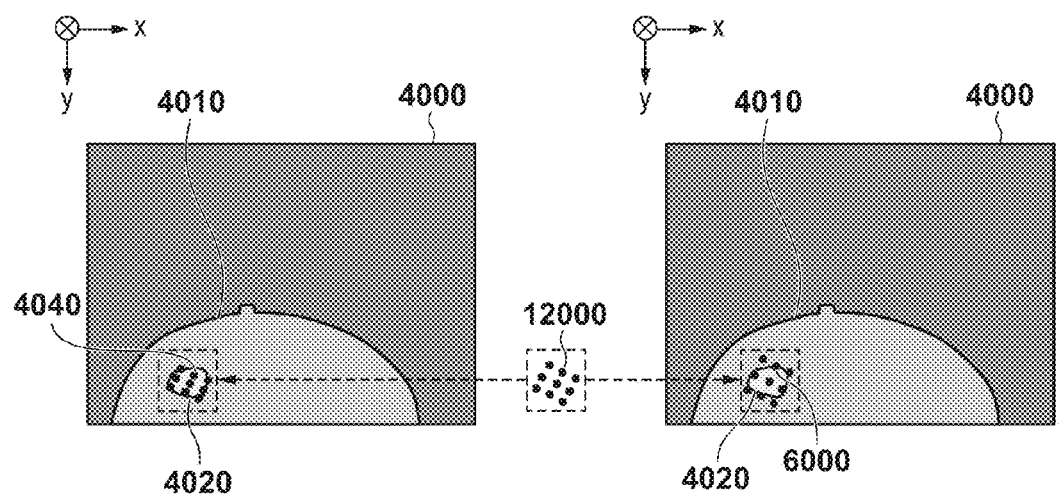
FIG. 12 is a view showing intermediate representative points.

FIG. 12 is a view showing intermediate representative points 12000. As can be seen from FIG. 12, the intermediate representative points 12000 have a distribution between the distribution of deformed representative points 4040 obtained by obliquely crushing the distribution of the original representative points and the uncrushed distribution of rigid body representative points (approximated representative points) 6000.

(S11090) (Obtaining Second Deformation Based on Obtained Virtual Corresponding Points)

In step S11090, the second deformation obtaining unit 1060 performs deformation alignment of the first image obtained from the data obtaining unit 1010 with the second image based on the obtained virtual corresponding points. The virtual corresponding points used in step S2050 of the first embodiment are limited to the approximated virtual corresponding points. In this embodiment, however, either of the approximated virtual corresponding points and the intermediate virtual corresponding points is used, unlike the first embodiment. That is, if $\lambda_R=1$, the approximated virtual corresponding points generated in step S11060 are used. If $\lambda_R \neq 1$, the intermediate virtual corresponding points generated in step S11080 are used. However, the deformation alignment processing based on the obtained virtual corresponding points is the same as in step S2050, and a detailed description thereof will be omitted.

(S11110) (End Determination)

In step S11110, the display control unit 1070 obtains, from the operation unit (not shown), a user instruction concerning whether to end the processing. Upon obtaining an instruction "to end", the processing ends. Upon obtaining an instruction "not to end", the process returns to step S11030 to maintain a state to wait for a user input. Hence, if the user observes the first deformed image or the second deformed image as the alignment result in step S11100 and consequently determines that the alignment is completed, the instruction "to end" is given via the operation unit (not shown), thereby allowing the image processing apparatus 1000 to end the processing. On the other hand, if the user observes the image as the alignment result and consequently determines to change the degree of shape maintenance and observe the result again, the instruction "not to end" is given via the operation unit (not shown), thereby allowing the image processing apparatus 1000 to give a new degree of shape maintenance and generate and display an alignment result again.

The processing of the image processing apparatus 1000 is thus executed. According to this processing procedure, for example, if the transformation parameter can be calculated by linear optimization in steps S11020 and S11090, the alignment can be done at a high speed. For this reason, if the user interactively inputs the degree of shape maintenance to the image processing apparatus 1000, the second deformed image corresponding to the input can be displayed. More specifically, assume that the operation unit (not shown) is a slider capable of adjusting the degree of shape maintenance from 0 to 1. At this time, if the user moves the slider, the instruction "not to end" is given to the image processing apparatus 1000. This enables the image processing apparatus 1000 to generate and display a deformed image based on the degree of shape maintenance corresponding to the slider position. Accordingly, when the user, for example, gradually moves the slider position from 0 to 1, the image processing apparatus 1000 can synchronously gradually display the second deformed image keeping the shape on the display unit 120 almost in real time. Hence, the user can easily determine the second deformed image based on the appropriate degree of shape maintenance while observing the second image and the second deformed image displayed on the display unit 120. Note that the interface of the operation unit (not shown) used by the user to interactively input the degree of shape maintenance is not limited to the slider, and, for example, a numerical value may directly be input.

According to this embodiment, the image processing apparatus 1000 uses the intermediate virtual corresponding points located between the deformed virtual corresponding points and the approximated virtual corresponding points of the region of interest as the alignment index between the images. Accordingly, concerning the deformation of the region of interest, an alignment result corresponding to the deformation state between the first deformation and the approximation transformation can be obtained. It is therefore possible to appropriately align the entire object even in an image including a lesion that is harder than the periphery but can deform.

(Modification 3-1) (Intermediate Virtual Corresponding Points are Generated by Nonlinear Interpolation)

In the third embodiment, in step S11080, the intermediate representative point that forms the intermediate virtual corresponding point is obtained as a point on the line segment connecting the deformed representative point and the approximated representative point. In other words, the coordinate is obtained by linearly interpolating between the coordinate of the deformed representative point and that of the approximated representative point. However, the generation method of the intermediate representative point is not limited to this, and the coordinate may be obtained by nonlinearly interpolating between the coordinate of the deformed representative point and that of the approximated representative point. That is, the change from the first deformation displacement field to the second deformation displacement field concerning the region of interest can be either linear or nonlinear.

For example, the following method may be employed. First, the corresponding information generation unit 1050 extracts only points set on the surface of the region of interest from the deformed representative point and the approximated representative point of the region of interest. These points will be referred to as deformed surface representative points and approximated surface representative points. Next, the corresponding information generation unit 1050 generates intermediate surface representative points located between the deformed surface representative points and the approximated surface representative points by linear interpolation based on the value $\lambda_R$ of the degree of shape maintenance, as in step S11080. These points will be referred to as intermediate surface representative points. The corresponding information generation unit 1050 sets the positions of the approximated surface representative points and the intermediate surface representative points as the boundary condition, and estimates the deformation in the region of interest by a physical deformation simulation in directions from the approximated surface representative points to the intermediate surface representative points.

The simulation is done here using the approximate surface representative points as a reference because the state in which the region of interest confirms to the approximation transformation model is virtually defined as a state in which no external force is generated. It is assumed that the region of interest corresponding to the deformed surface representative points represents a state in which the largest external force is generated, and the region of interest corresponding to the intermediate surface representative points represents a state in which an intermediate external force is generated. In addition, a predetermined value is set in advance as the value of the Young's modulus/Poisson's ratio of the region of interest necessary for the simulation. For example, the image processing apparatus 1000 prepares the tables of Young's modulus/Poisson's ratio values corresponding to the types of regions of interest in advance. The corresponding information generation unit 1050 obtains the type of the region of interest of the case from clinical data or the like, thereby obtaining a corresponding Young's modulus/Poisson's ratio value from the value and setting the value. The corresponding information generation unit 1050 is assumed to obtain the information of the type of the region of interest from the data server 110 via the data obtaining unit 1010 and the region-of-interest obtaining unit 1020. The corresponding information generation unit 1050 can obtain the representative points in the region of interest corresponding to the intermediate surface representative points by transforming the approximated representative points using the displacement field obtained by the simulation. The representative points will be referred to as intermediate internal representative points. When the intermediate surface representative points and the intermediate internal representative points are added, intermediate representative points after the transformation are obtained concerning the entire region of interest. Hence, the corresponding information generation unit 1050 obtains these points as the intermediate representative points.

With this processing, regarding the surface of the region of interest, coordinates resulted from linear interpolation between the coordinates of the approximated representative points and the coordinates of the deformed representative points are obtained. On the other hand, regarding the internal region, the coordinates can be obtained by nonlinearly interpolating the coordinates of the approximated representative points and the deformed representative points (to more physically consistent positions). Note that, for example, when the Young's modulus in the region of interest is changed depending on the region, different nonlinear interpolation can be performed for each region. For example, the Young's modulus is made large in a region close to the barycenter of the region of interest and made small in a region close to the surface of the region of interest. In this case, the portion near the barycenter of the region of interest is hard, and the displacement amount is small. On the other hand, the portion near the surface of the region of interest is soft, and the displacement amount is large. Accordingly, a deformation close to reality can be obtained concerning, for example, a lesion with a hard center and a soft periphery.

(Modification 3-2) (Plural Second Images are Generated by Obtaining Plural Degrees of Shape Maintenance at Once)

In the third embodiment, in step S11030, the degree-of-shape-maintenance obtaining unit 10010 obtains only one degree of shape maintenance. In steps S11040 to S11090, only one deformed image corresponding to the value is generated. If necessary, processing of obtaining a degree of shape maintenance again generating a deformed image corresponding to it is repeated. However, the degree-of-shape-maintenance obtaining unit 10010 may obtain a plurality of values of degree of shape maintenance at once, and generate a plurality of deformed images corresponding to them at once.

For example, in step S11030 after steps S11000 to S11025, the degree-of-shape-maintenance obtaining unit S11025 obtains a plurality of predetermined values $\lambda_R$ of the degree of shape maintenance. For example, the degree-of-shape-maintenance obtaining unit 10010 obtains all of {0, 0.25, 0.5, 0.75, 1.0} as $\lambda_R$. At this time, the image processing apparatus 1000 does not perform the processes of steps S11040 and S11070. Next, the deformation approximation unit 1040 and the corresponding information generation unit 1050 perform the processes of step S11050 and S11060 to generate approximated virtual corresponding points. In step S11080, the corresponding information generation unit 1050 generates intermediate virtual corresponding points corresponding to all degrees of shape maintenance that meet $\lambda_R \neq 0$ and $\lambda_R \neq 1$. In the above-described example, the corresponding information generation unit 1050 generates three types of intermediate virtual corresponding points corresponding to {0.25, 0.5, 0.75}. In step S11090, the second deformation obtaining unit 1060 generates corresponding second deformed images based on the approximated virtual corresponding points generated in step S11060 and all the intermediate virtual corresponding points generated in step S11080. In the above-described example, second deformed images corresponding to a total of four types of virtual corresponding points, that is, the three types of intermediate virtual corresponding points (corresponding to $\lambda_R$=0.25, 0.5, 0.75) and the approximated virtual corresponding points (corresponding to $\lambda_R$=1) are generated.

In step S11100, the display control unit 1070 displays all the generated deformed images. In the above-described example, a total of five types of deformed images, that is, the first deformed image (corresponding to $\lambda_R$=0) and the four types of second deformed images (corresponding to $\lambda_R$=0.25, 0.5, 0.75, 1.0) are displayed. As for the display method, for example, all the deformed images may be displayed side by side or may be selectively displayed on the same display region in accordance with a user input from the operation unit (not shown).

According to this modification, the image processing apparatus 1000 performs the processes of steps S11000 to S11090 offline in advance without intervention of user input. In this case, the image processing apparatus 1000 stores all the generated deformed images in a storage unit (not shown). Then, in step S11100, the deformed images are read out from the storage unit and displayed. In the third embodiment, to display the result of a different degree of shape maintenance, the processes of steps S11040 to S11090 need to be performed every time, and the user is given a wait time. In the processing of this modification, however, the plurality of deformed images generated in advance are only read out and displayed in step S11100. For this reason, the user can observe the deformed images without any wait time and efficiently perform the operation.

Fourth Embodiment

In the first embodiment, the error of landmark corresponding point positions is employed as an example of the alignment evaluation function. However, the evaluation function may include an error of information that is not obtained as points having a one-to-one correspondence. An image processing apparatus according to this embodiment obtains the degree of matching of a surface shape between images for a certain transformation parameter based on the information of the surface shape of an object extracted for each image, and uses the degree of matching as the error term of an evaluation function. A transformation parameter that makes the surface shapes match can thus be calculated. Concerning an image processing apparatus according to this embodiment, points different from the first embodiment will be described below.

Figure 13:
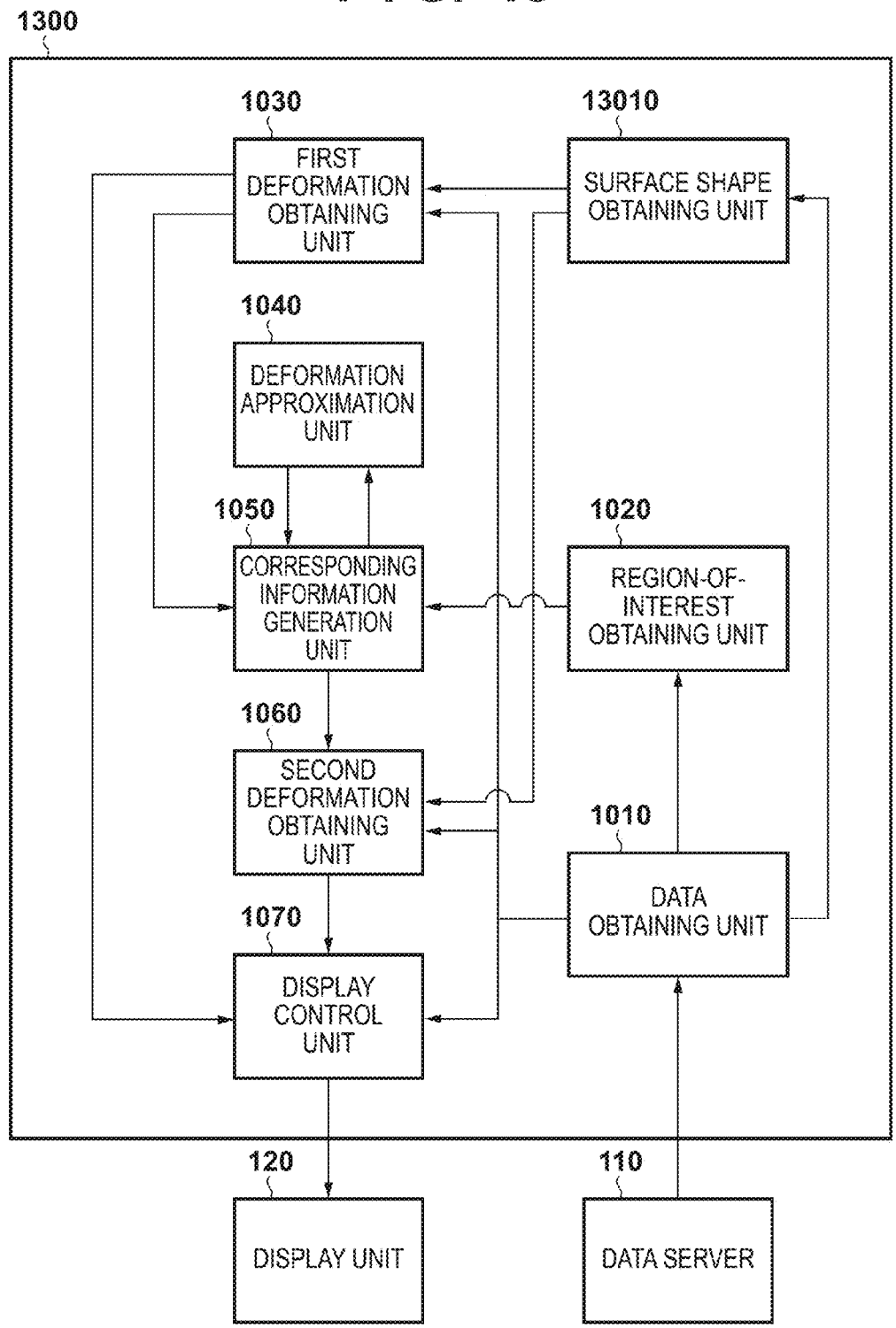
FIG. 13 is a block diagram showing the arrangement of an image processing apparatus according to the fourth embodiment.

FIG. 13 shows the arrangement of an image processing apparatus 1300 according to this embodiment. Referring to FIG. 13, the arrangement is the same as that of the image processing apparatus 100 (FIG. 1) according to the first embodiment except that a surface shape obtaining unit 13010 is newly added. The functions of a first deformation obtaining unit 1030 and a second deformation obtaining unit 1060 are different from those in the first embodiment, and a description thereof will be made below. The functions of the remaining components are the same as in the first embodiment, and a description of the same functions will be omitted.

The surface shape obtaining unit 13010 obtains the surface shape of the object from each of the first image and the second image. The functions of the first deformation obtaining unit 1030 and the second deformation obtaining unit 1060 are almost the same as in the first embodiment but are different from the first embodiment only in that deformation alignment is performed based on the obtained surface shape as well.

Figure 14:
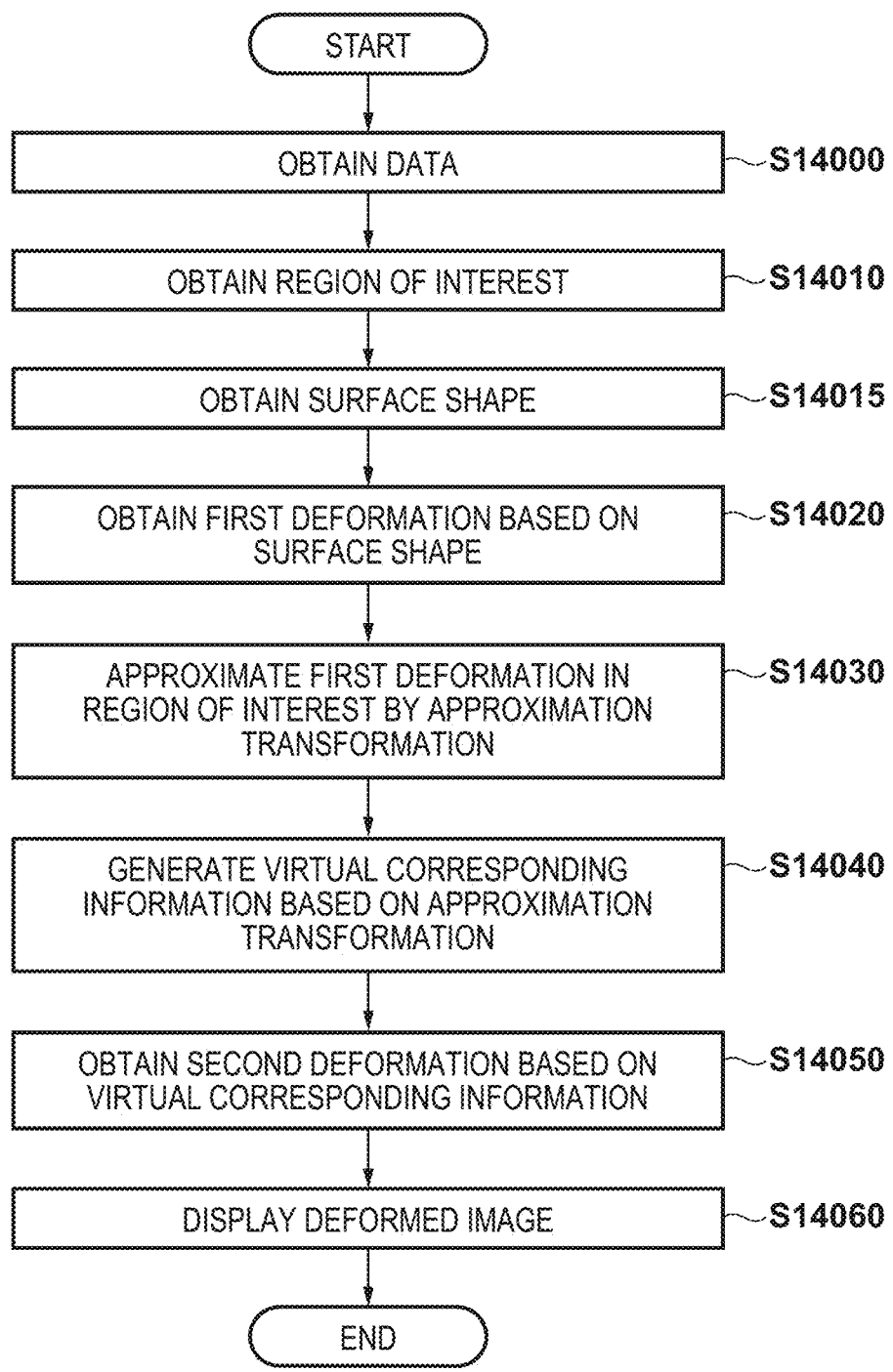
FIG. 14 is a flowchart showing an overall processing procedure according to the fourth embodiment.

FIG. 14 is a flowchart showing an overall processing procedure performed by the image processing apparatus 1300. The processes of steps S14000, S14010, S14030, S14040, and S14060 of this flowchart are the same as the processes of steps S2000, S2010, S2030, S2040, and S2060 shown in FIG. 2, and a description thereof will be omitted. Note that only points different from the flowchart of FIG. 2 will be described below.

(S14015) (Obtaining of Surface Shape)

In step S14015, the surface shape obtaining unit 13010 obtains information representing the surface shape of the object in each of the first image and the second image obtained from a data obtaining unit 1010. For example, if the object is a breast, the surface of the object means the body surface or the greater pectoral muscle surface. If the object is an organ such as a liver or a kidney, the surface means the surface of the organ. The surface shape can automatically be obtained by, for example, performing image processing such as surface enhancement filter or edge detection for the image. Alternatively, the user may be allowed to observe the image, and the surface shape may be obtained based on an input operation or the like by the user. The obtained surface shapes of the first image and the second image will be referred to as a first surface shape and a second surface shape, respectively. In this embodiment, the surface shape is formed from a point group. However, the surface shape need not always be formed from a point group, and can use any format capable of expressing the shape. For example, the surface shape may be a function (to be referred to as a curved surface function hereinafter) approximated by a formula capable of expressing a curved surface such as a polynomial. The obtained first and second surface shapes are output to the first deformation obtaining unit 1030 and the second deformation obtaining unit 1060.

(S14020) (Obtaining of First Deformation Based on Surface Shape)

In step S14020, the first deformation obtaining unit 1030 executes first deformation alignment between the obtained first and second images based on the obtained first and second surface shapes, thereby obtaining a first deformation displacement field. The first deformation obtaining unit 1030 outputs the obtained first deformation displacement field to a corresponding information generation unit 1050. The first deformation obtaining unit 1030 also generates a first deformed image by deforming the first image based on the first deformation displacement field, and outputs it to a display control unit 1070.

At this time, the first deformation obtaining unit 1030 defines an evaluation function $E1(\Phi)$ that evaluates the adequacy of alignment by a deformation $\Phi$, and estimates the deformation $\Phi$ that minimizes the evaluation function, as in step S2020 of the first embodiment. The process of this step and that of step S2020 are different only in the calculation method of the evaluation function $E1(\Phi)$. The rest of the process is the same as in step S2020, and a description thereof will be omitted. In step S2020, the error of an actual corresponding point position in the evaluation function $E1(\Phi)$ is represented by the error of a landmark corresponding point position. In this step, however, the error of an actual corresponding point position is represented by a function including not only the error of a landmark corresponding point position but also the error of the surface shape between the images. The error of the surface shape is expressed as the error of the positions of corresponding points (surface corresponding points) that associate the point groups representing the surface shapes in the images.

A detailed calculation method will be described below. The error term of surface corresponding point positions is calculated as an error of surface corresponding points generated as surface corresponding points associated in a one-to-one correspondence between the first surface shape and the second surface shape each expressed as a point group. However, the point groups of the first surface shape and the second surface shape are not associated from the beginning. For this reason, it is necessary to perform alignment between the curved surface of the surface shape expressed by the point group of the first surface shape and the curved surface of the surface shape expressed by the point group of the second surface shape and associate the point groups. This processing can be executed using a known method, for example, an Iterative Closest Point (ICP) method. If the original surface shapes are largely different between the images, a deformation alignment field using only the error of landmark corresponding points is calculated first by the same processing as in step S2020. The deformation alignment field is applied to the first surface shape, thereby temporarily obtaining the deformed first surface shape close to the second surface shape. The point group representing the first surface shape and the point group representing the second surface shape may be associated by the ICP method or the like. In this case, even if the original surface shapes are largely different between the images, the point groups can appropriately be associated between the first surface shape and the second surface shape. Note that the surface shape associating method is not limited to this. For example, one surface shape may be obtained as a point group, and the other surface shape may be obtained as a curved surface function. The point group and the curved surface function may be associated by the ICP method or the like while searching for a nearest neighbor point on the curved surface function corresponding to the point group. The point group representing one surface shape is thus associated with a point on the surface shape expressed by the other continuous form. It is therefore possible to avoid the problem of an error that occurs when the surface shapes of both images are discretized as point groups because of the absence of a point on the other surface shape strictly corresponding to a point on one surface shape.

An error term Surf(Φ) of the surface corresponding points is given by $$\text{Surf}(\phi) = \frac{1}{N_S} \sum_{i=1}^{N_S} \|\text{Cov}^{-1}(x_{S2i})(\phi(x_{S1i} \mid p1) - x_{S2i})\|^2 \quad (9)$$

where Φ(x|p1) is a coordinate obtained by displacing a coordinate x by the first deformation Φ represented by a predetermined transformation model using a parameter p1, and ($x_{s1i}$, $x_{s2i}$) represent the set of the coordinates of ith surface corresponding points on the first image and the second image. Additionally, NS is the total number of surface corresponding points, and Cov(x) is the function of returning a covariance matrix concerning a three-dimensional error at the position x, as in Modification 1-2 of the first embodiment. Equation (9) is an equation obtained by only replacing the approximated virtual corresponding points ($x_{R1i}$, $x_{R2i}$) of equation (6) with the surface corresponding points ($x_{S1i}$, $x_{S2i}$) and the transformation parameter p2 with the transformation parameter p1. Hence, when the parameter is replaced in Modification 1-2 in the way, equation (9) can be interpreted as follows. That is, Surf(Φ) functions as a term to prevent a surface corresponding point of the first surface shape after the displacement by the transformation parameter p1 from shifting only in the normal direction from a corresponding surface corresponding point of the second surface shape. That is, the surface corresponding point set on the surface shape is allowed to move along the surface of the surface shape when calculating the first displacement field. Note that the evaluation function E1(Φ), that is, the error of the actual corresponding point can be calculated by adding the error term Surf(Φ) of the surface corresponding point to the error term of the landmark corresponding point, as described above. The error of the actual corresponding point may be formed from only the error term Surf(Φ) of the surface corresponding point.

As described above, since the evaluation function E1(Φ) is represented by only the error term of the corresponding point positions, the relationship between the transformation parameter and the error between the corresponding points can be expressed as a linear equation as described concerning step S2050 of the first embodiment. Hence, the transformation parameter p1 that minimizes the error between the corresponding points can be estimated by a linear optimization method.

(S14050) (Obtaining of Second Deformation Based on Surface Shape)

In step S14050, the second deformation obtaining unit 1060 obtains the second deformation displacement field using the approximated virtual corresponding points (virtual corresponding information) obtained in step S14040 as a constraint. At this time, when calculating a second evaluation function E2(Φ), the degree of matching between the first surface shape and the second surface shape obtained in step S14015 is taken into consideration, as in the process of step S14020, unlike the first embodiment. When calculating the second evaluation function E2(Φ), an error term R(Φ) of approximated virtual corresponding points added to the first evaluation function E1(Φ) also serves as the error term of corresponding point positions. Hence, since even the evaluation function E2(Φ) of final alignment is also expressed by only the error term of the corresponding point positions, the relationship between the transformation parameter and the error between the corresponding points can be expressed as a linear equation. Hence, the transformation parameter p2 that minimizes the error between the corresponding points can be estimated by a linear optimization method.

The processing of the image processing apparatus 1300 is thus executed. According to this embodiment, alignment that makes the surface shapes of the object match can be performed. At this time, even if the degree of matching (error) between the surface shapes of the images which are not obtained in advance as corresponding points is included in the evaluation function, the transformation parameter can be calculated by linear optimization, and the alignment result can be obtained at a high speed. In addition, according to this embodiment, the surface corresponding point set on the surface shape of the object is allowed to move along the surface of the surface shape in alignment. The following effect can be obtained by this. In this embodiment, the surface shapes are associated by a method such as the ICP method. However, because of the unstable algorithm or insufficient accuracy, anatomically strictly correct positions are not always associated on the surfaces of the surface shapes of the images. For this reason, an error of association occurs to an extent. Hence, because of the error of association of the positions on the surfaces of the surface shapes, the distance between corresponding points existing in the neighborhood on the surface shape may be largely different between the images. If alignment is performed using an evaluation function that simply makes the corresponding point positions themselves match each other as much as possible, the surface shape locally unnaturally expand or contract. On the other hand, if alignment is performed using an evaluation function that allows a surface corresponding point to move on the surface of the surface shape, the alignment is performed in a state in which an error is permitted along the surface of the surface shape based on the characteristic of the transformation model that expresses the deformation. Accordingly, when a transformation model such as an FFD or TPS which is known to express a smooth deformation is applied, as in this embodiment, an alignment result in which the surface shape of the object never locally unnaturally deforms can be obtained.

(Modification 4-1)

In the above embodiment, the second deformation is obtained by controlling the deformation of the region of interest, as in the first to third embodiments. However, even if the deformation of the region of interest is not controlled (need not be controlled), the effect of the above processing that uses processing for making the surface shapes of the object match in alignment is not lost. That is, the first deformation may be used as the deformation result without executing the processes of steps S14010 and S14030 to S14050.

Fifth Embodiment

In Modification 4-1 of the fourth embodiment described above, a case in which based on the surface shape of the object, the degree of matching of the surface shape between the images is used as the error term of the alignment evaluation function has been described. However, these embodiments are merely examples of the implementation of the present invention. In this embodiment, an example different from the form of Modification 4-1 will be described.

Figure 15:
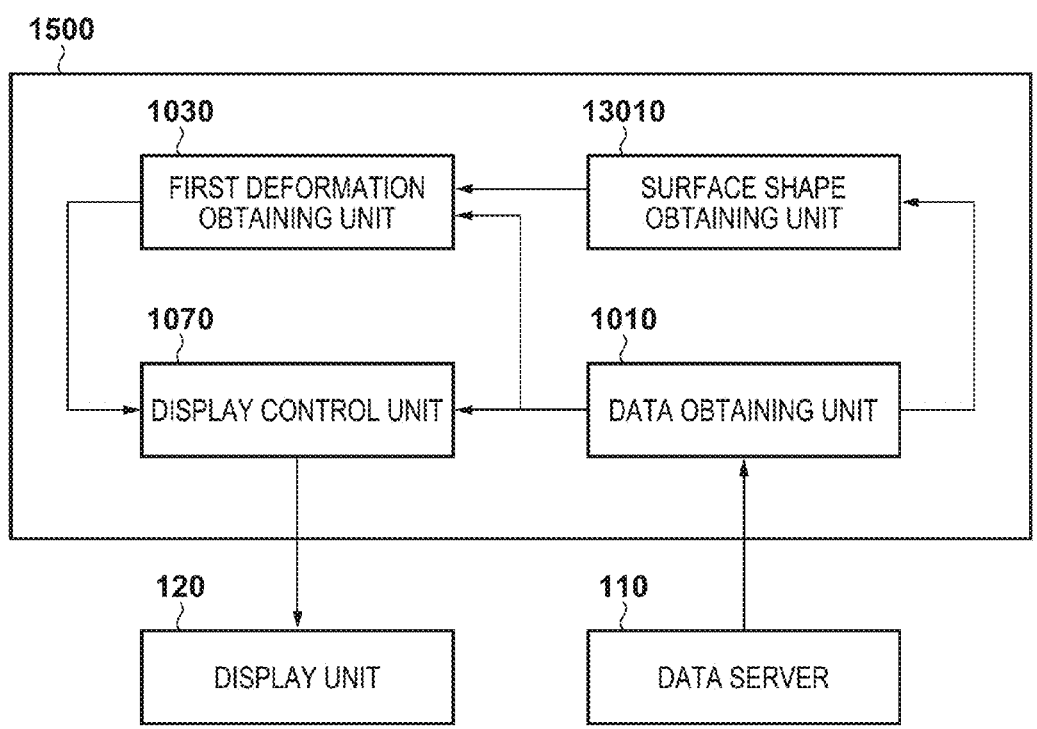
FIG. 15 is a block diagram showing the arrangement of an image processing apparatus according to the fifth embodiment.

FIG. 15 shows the arrangement of an image processing apparatus 1500 according to this embodiment. The image processing apparatus 1500 according to this embodiment is formed from the same constituent elements as some constituent elements of the image processing apparatus 1300 described in the fourth embodiment. The same reference numerals denote the constituent elements having the same functions, and a detailed description thereof will be omitted.

Figure 16:
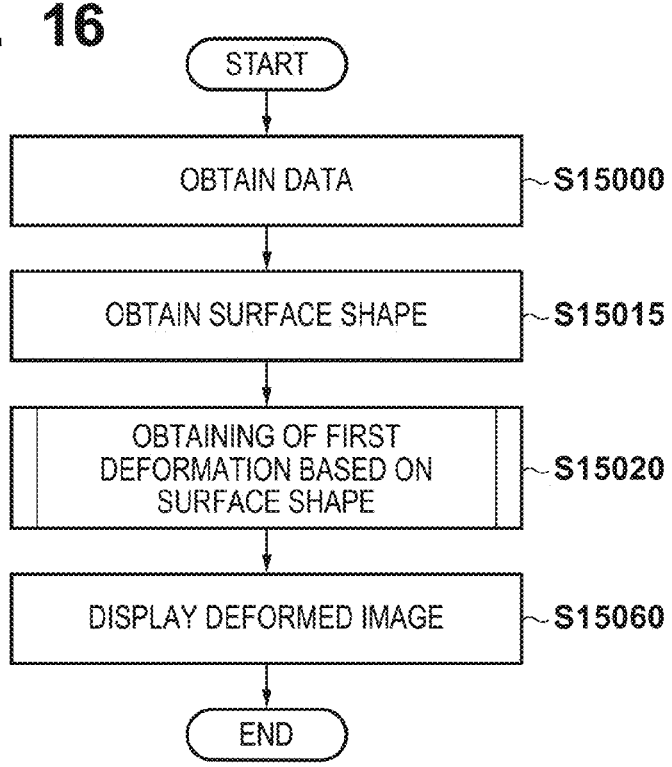
FIG. 16 is a flowchart showing an overall processing procedure according to the fifth embodiment.

FIG. 16 is a flowchart showing an overall processing procedure performed by the image processing apparatus 1500 according to this embodiment.

(S15000) (Obtaining of Data)

In step S15000, the data obtaining unit 1010 obtains the first image and the second image from a data server 110. This processing is the same as that of step S14000 according to the fourth embodiment, and a description thereof will be omitted.

(S15015) (Obtaining of Surface Shape)

In step S15015, a surface shape obtaining unit 13010 obtains information representing the surface shape of the object in each of the first image and the second image obtained from the data obtaining unit 1010. This processing is the same as that of step S14015 according to the fourth embodiment, and a description thereof will be omitted.

(S15020) (Obtaining of First Deformation Based on Surface Shape)

In step S15020, a first deformation obtaining unit 1030 executes first deformation alignment between the obtained first and second images based on the obtained first and second surface shapes, thereby obtaining a first deformation displacement field. The first deformation obtaining unit 1030 also generates a first deformed image by deforming the first image based on the first deformation displacement field and outputs it to a display control unit 1070.

Figure 17:
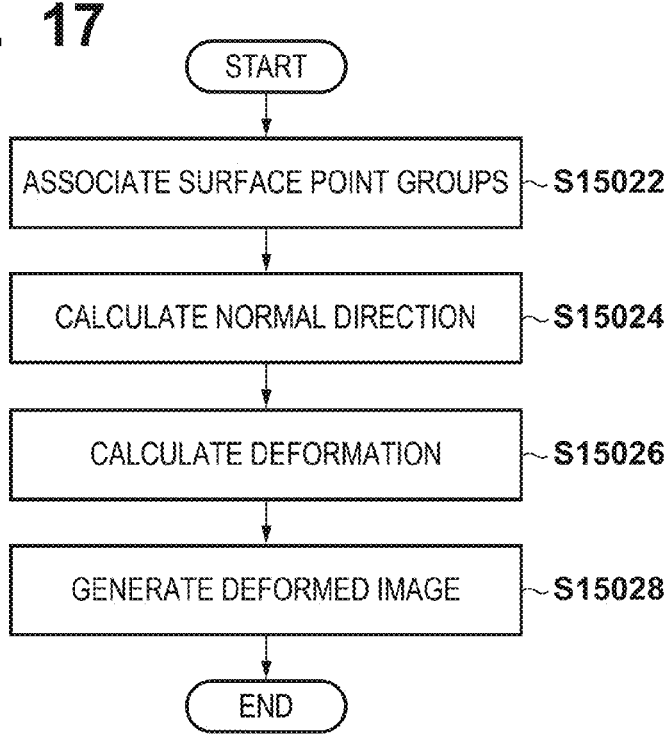
FIG. 17 is a flowchart showing a detailed procedure of processing of obtaining a first deformation according to the fifth embodiment.

FIG. 17 is a flowchart for explaining the processing executed by the first deformation obtaining unit 1030 in this processing step in more detail.

(S15022) (Correspondence Relationship Obtaining)

In step S15022, the first deformation obtaining unit 1030 executes processing of associating point groups that form the first surface shape and the second surface shape. As a detailed processing method, the ICP method described as an example for step S14020 according to the fourth embodiment or the like can be used. By this processing, surface corresponding points $(x_{S1i}, x_{S2i})$, $1 \le i \le N_S$ are obtained, where $N_S$ is the total number of surface corresponding points.

(S15024) (Normal Direction Obtaining)

In step S15024, the first deformation obtaining unit 1030 executes processing of calculating a normal direction concerning the surface shape at the position of each of the surface corresponding points obtained in step S15022. Here, $x_{s1i}$ and $x_{s2i}$ that constitute the surface corresponding points $(x_{S1i}, x_{S2i})$ are points that constitute the first surface shape and the second surface shape, respectively. In this processing step, a vector (first normal vector) $n_{1i}$ representing the normal direction of the first surface shape at the position $x_{S1i}$ and a vector (second normal vector) $n_{2i}$ representing the normal direction of the second surface shape at the position $x_{S2i}$ are calculated and obtained. As the method of calculating the normal vector from the surface shape, the method (the method of obtaining the position of a point group near the position of interest by principal component analysis) described in Modification 1-2 can be used. In the normal vector calculation method, alternatively, the distance field of the surface shape may be calculated, and a normal vector may be calculated based on the spatial gradient of the distance field. The vector $n_{1i}$ at the position $x_{S1i}$ of the first surface shape and the vector $n_{2i}$ at the position $x_{S2i}$ of the second surface shape, which are obtained by the above-described method, are obtained. Note that $n_{1i}$ and $n_{2i}$ are three-dimensional vectors with a norm normalized to 1.0.

(S15026) (Deformation Calculation)

In step S15026, the first deformation obtaining unit 1030 obtains the first deformation displacement field based on the processing results of step S15022 and S15024.

At this time, the first deformation obtaining unit 1030 defines an evaluation function that evaluates the adequacy of alignment by a deformation $\Phi$, and estimates the deformation $\Phi$ that minimizes the evaluation function, as in step S14020 of the fourth embodiment.

$$\text{Surf}(\phi) = \frac{1}{N_S} \sum_{i=1}^{N_S} \{ \|\text{Cov}_{2i}^{-1}(\phi(x_{S1i} \mid p1) - x_{S2i})\|^2 + \|\text{Cov}_{1i}^{-1}(x_{S1i})(\phi^{-1}(x_{S2i} \mid p1) - x_{S1i})\|^2 \} \quad (10)$$

where $\Phi(x|p1)$ is a coordinate obtained by displacing a coordinate x by the first deformation $\Phi$ represented by a predetermined transformation model using a parameter p1. In this embodiment, $\Phi(x|p1)$ means transformation from the coordinate system of the first image to the coordinate system of the second image. $\Phi^{-1}(x|p1)$ is the inverse function of $\Phi(x|p1)$, which means transformation from the coordinate system of the second image to the coordinate system of the first image. $\text{Cov}_{1i}$ and $\text{Cov}_{2i}$ are covariance matrices concerning a three-dimensional error at the position of an ith surface corresponding point. $\text{Cov}_{1i}$ is calculated based on the normal vector $n_{1i}$ at the position $x_{S1i}$ of the first surface shape. $\text{Cov}_{2i}$ is calculated based on the normal vector $n_{2i}$ at the position $x_{S2i}$ of the second surface shape.

(S15028) (Deformed Image Generation)

In step S15028, the first deformation obtaining unit 1030 generates a first deformed image by deforming the first image based on the first deformation displacement field obtained in step S15026, and outputs it to the display control unit 1070.

By steps S15022 to S15028 described above, the process of step S15020 according to this embodiment is executed.

(S15060) (Display of Deformed Image)

In step S15060, the display control unit 1070 performs control to display the slice images of the obtained deformed image and the second image on a display unit 120 in accordance with a user operation on an operation unit (not shown). This processing is the same as that of step S14060 according to the fourth embodiment, and a detailed description thereof will be omitted.

The processing of the image processing apparatus 1500 according to the fifth embodiment is thus executed. According to this embodiment, the first deformation displacement field can be obtained based on both the normal vector concerning the first surface shape and the normal vector concerning the second surface shape. It is therefore possible to obtain the effect of implementing a stable operation for the difference between the first surface shape and the second surface shape.

(Modification 5-1) (Normal Direction Calculation Method (Luminance Gradient of Image is Also Used))

In the above embodiment, a case in which the first normal vector is calculated based on the first surface shape has been described as an example. However, implementation of the present invention is not limited to this. For example, the first normal vector $n_{1i}$ may be calculated based on the luminance gradient near the surface corresponding point position $x_{S1i}$ of the first image. Similarly, the second normal vector $n_{2i}$ may be calculated based on the luminance gradient near the surface corresponding point position $x_{S2i}$ of the second image. Even if it is difficult to accurately calculate the normal vector from information about the surface shape, for example, even if the distribution of the point group representing the surface shape is spatially coarse, the subsequent processing can be executed.

The normal vector may be calculated based on both the surface shape and the luminance gradient of the image. For example, an intermediate vector between the normal vector calculated based on the surface shape and the normal vector calculated based on the luminance gradient of the image may be calculated, and the subsequent processing may be executed using the vector. Based on the degree of roughness of the surface shape, switching may be performed between normal vector calculation based on the surface shape and normal vector calculation based on the luminance gradient of the image. For example, if the spatial density of the point group representing the surface shape is more than a predetermined threshold, the normal vector can be calculated based on the surface shape. Otherwise, the normal vector can be calculated based on the luminance gradient of the image. The above switching may be done based on the magnitude of the luminance gradient of the image. According to these methods, it is possible to obtain the effect of more stably calculating the normal vector for the point group data representing the surface shape or the luminance distribution of the image.

(Modification 5-2) (Case in which Two Normal Directions are Integrally Used)

In the above embodiment, a case in which the first normal vector and the second normal vector are calculated, and the evaluation function of equation (10) is used based on the normal vectors has been described as an example. However, implementation of the present invention is not limited to this. For example, based on both the first normal vector and the second normal vector, a normal vector that integrates them may be calculated. The first deformation transformation may be obtained using the evaluation function of equation (9) described in the fourth embodiment based on the integrated normal vector. More specifically, the first normal vector defined by the coordinate system of the first image obtained in step S15015 is transformed into a normal vector in the coordinate system of the second image based on the coordinate transformation $\Phi(x|p1)$. More specifically, a normal vector is calculated by $n_{1i}'=\Phi(x_{1i}+n_{1i}|p1)-\Phi(x_{1i}|p1)$. An intermediate vector $n_{mi}$ is calculated from $n_{1i}'$ and $n_{2i}$. Then, it is possible to calculate a covariance matrix $Cov(x)$ by the method described concerning step S14020 according to the fourth embodiment and obtain the first deformation displacement field using the evaluation function of equation (9) according to the fourth embodiment. According to the above-described method, the present invention can be implemented by a simpler calculation as compared to the method described in the fifth embodiment that uses equation (10).

When calculating the intermediate vector between the first normal vector $n_{1i}'$ transformed into the coordinate system of the second image and the second normal vector $n_{2i}$, different weights may be added to these vectors. For example, the weights can be set based on the types of imaging apparatuses (modalities) of the first image and the second image. For example, if the first image is obtained by a modality capable of calculating the surface shape of the object at higher reliability as compared to the second image, a large weight can be set for the first normal vector. Accordingly, since the normal vector can be calculated while placing importance on information about the more reliable surface shape, the first deformation displacement field can accurately be obtained. The weighting need not always be done based on the type of the modality. For example, the reliabilities of the first surface shape and the second surface shape may be obtained, and the weights may be set based on them. The reliabilities may be obtained by, for example, an input operation by the user. Alternatively, the reliabilities may be obtained based on the spatial densities of point groups representing first and second body surface shapes or the noise levels of the first and second images. In this case, a single weight may be set for all body surface corresponding points, or a weight may individually be set for each body surface corresponding point. The weights to be set may be continuous values from 0 to 1 or binary values "0" and "1".

(Modification 5-3) (Evaluation Value is Calculated by Integrating Evaluation Values in Respective Normal Directions)

In the fifth embodiment, a case in which a general evaluation value is calculated by adding an evaluation value calculated based on the first normal vector and an evaluation value calculated based on the second normal vector, as represented by equation (10), has been described as an example. However, implementation of the present invention is not limited to this. For example, the evaluation function may be formed as $$\text{Surf}(\phi) = \frac{1}{N_S} \sum_{i=1}^{N_S} \min\{\|\text{Cov}_2^{-1}(x_{S2i})(\phi(x_{S1i}\mid p1) - x_{S2i})\|^2, \quad (11)$$
$$\|\text{Cov}_{1i}^{-1}(x_{S1i})(\phi^{-1}(x_{S2i}\mid p1) - x_{S1i})\|^2\}$$

where a function min (a, b) is a low selection function. Of the evaluation value as the first argument of the function min and the evaluation value as the second argument, the evaluation value of higher evaluation (smaller value) is employed as the general evaluation. According to this method, if the directions of the first normal vector and the second normal vector are largely different, a more appropriate deformation displacement field can be obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-006556, filed Jan. 15, 2016, and No. 2016-207259, filed Oct. 21, 2016 which are hereby incorporated by reference herein in their entirety.

What is claimed is:

1. An image processing apparatus comprising:
a memory storing a program; and
one or more processors which, by executing the program, function as units comprising:
(1) a data obtaining unit configured to obtain a first image and a second image obtained by imaging an object under different conditions, wherein the first image and the second image are three-dimensional tomographic images;
(2) a region-of-interest obtaining unit configured to obtain a region of interest in the first image;
(3) a first deformation obtaining unit configured to obtain a first deformation displacement field between the first image and the second image;
(4) a deformation approximation unit configured to approximate the first deformation displacement field in the region of interest using an approximation transformation model of a degree of freedom lower than that of the first deformation displacement field, thereby generating an approximated displacement field;
(5) a corresponding information generation unit configured to generate, concerning the region of interest, corresponding information between the first image and the second image based on the approximated displacement field; and
(6) a second deformation obtaining unit configured to obtain a second deformation displacement field between the first image and the second image using the corresponding information as a constraint which restricts a transformation of the region of interest to the approximation transformation model.

2. The apparatus according to claim 1, wherein the first deformation obtaining unit generates a first deformed image by displacing the first image based on the first deformation displacement field, and
wherein the second deformation obtaining unit generates a second deformed image by displacing the first image based on the second deformation displacement field.

3. The apparatus according to claim 2, wherein the corresponding information represents virtual corresponding points obtained based on a plurality of representative points set on the region of interest and a plurality of representative points obtained by displacing the representative points using the approximated displacement field.

4. The apparatus according to claim 3, wherein a positional relationship of the plurality of set representative points and a positional relationship of the plurality of displaced representative points match.

5. The apparatus according to claim 3, wherein the plurality of displaced representative points are allowed to move along a surface of the region of interest.

6. The apparatus according to claim 2, wherein the corresponding information represents a virtual shape obtained based on a region set on the region of interest and a region obtained by displacing the set region using the approximated displacement field.

7. The apparatus according to claim 1, further comprising an approximation transformation model selection unit configured to select, based on a characteristic of the region of interest, the approximation transformation model to be used to generate the approximated displacement field.

8. The apparatus according to claim 7, wherein if a plurality of regions of interest exist, the approximation transformation model selection unit selects the approximation transformation model to be used to generate the approximated displacement field, based on the characteristic of each region of interest.

9. The apparatus according to claim 1, further comprising a degree-of-shape-maintenance obtaining unit configured to obtain a degree of shape maintenance representing a degree of change from the first deformation displacement field to the second deformation displacement field concerning the region of interest,
wherein the corresponding information generation unit generates corresponding information between the first image and an image obtained by displacing the first image based on the approximated displacement field and the degree of shape maintenance.

10. The apparatus according to claim 9, wherein the change from the first deformation displacement field to the second deformation displacement field concerning the region of interest is linear.

11. The apparatus according to claim 9, wherein the change from the first deformation displacement field to the second deformation displacement field concerning the region of interest is nonlinear.

12. The apparatus according to claim 3, wherein the first deformation displacement field is calculated based on evaluation of an error of positions of real corresponding points that actually correspond between the first image and the second image, and
wherein the second deformation displacement field is calculated based on evaluation of the error of the positions of the real corresponding points and an error of positions of the virtual corresponding points.

13. The apparatus according to claim 12, further comprising a surface shape obtaining unit configured to obtain a first surface shape of the object visualized in the first image and obtain a second surface shape of the object visualized in the second image,
wherein the real corresponding points are surface corresponding points that correspond between the first surface shape and the second surface shape.

14. The apparatus according to claim 13, wherein in the evaluation of the error of the positions of the real corresponding points, an error of a position in a normal direction of a curved surface of one of the first surface shape and the second surface shape is evaluated large, and an error of a position in a direction along the curved surface is evaluated small.

15. The apparatus according to claim 1, wherein the approximation transformation model is a rigid body transformation model.

16. The apparatus according to claim 1, wherein the obtaining unit obtains the region of interest based on an operation by a user.

17. The apparatus according to claim 1, further comprising a display control unit configured to perform control to display the first deformed image and the second deformed image on a display unit.

18. An image processing apparatus comprising:
a memory storing a program; and
one or more processors which, by executing the program, function as units comprising:
(1) a data obtaining unit configured to obtain a first image and a second image obtained by imaging an object under different conditions;
(2) a surface shape obtaining unit configured to obtain a first surface shape of the object visualized in the first image and obtain a second surface shape of the object visualized in the second image; and
(3) a deformation obtaining unit configured to obtain a deformation displacement field between the first image and the second image based on evaluation of an error between the first surface shape and the second surface shape,
wherein in the evaluation of the error, an error of a position in a normal direction of a curved surface of one of the first surface shape and the second surface shape is evaluated large, and an error of a position in a direction along the curved surface is evaluated small,
wherein the deformation obtaining unit obtains the deformation displacement field between the first image and the second image to prevent a surface corresponding point of the first surface shape after the deformation displacement from shifting in the normal direction from a surface corresponding point of the second surface shape based on the evaluation of the error.

19. An image processing method comprising:
obtaining a first image and a second image obtained by imaging an object under different conditions, wherein the first image and the second image are three-dimensional tomographic images;
obtaining a region of interest in the first image;
obtaining a first deformation displacement field between the first image and the second image;
approximating the first deformation displacement field in the region of interest using an approximation transformation model of a degree of freedom lower than that of the first deformation displacement field, thereby generating an approximated displacement field;
generating, concerning the region of interest, corresponding information between the first image and the second image based on the approximated displacement field; and
obtaining a second deformation displacement field between the first image and the second image using the corresponding information as a constraint which restricts a transformation of the region of interest to the approximation transformation model.

20. A non-transitory computer-readable storage medium storing a computer program for causing a computer to execute an image processing method, the method comprising:
obtaining a first image and a second image obtained by imaging an object under different conditions, wherein the first image and the second image are three-dimensional tomographic images;
obtaining a region of interest in the first image;
obtaining a first deformation displacement field between the first image and the second image;
approximating the first deformation displacement field in the region of interest using an approximation transformation model of a degree of freedom lower than that of the first deformation displacement field, thereby generating an approximated displacement field;
generating, concerning the region of interest, corresponding information between the first image and the second image based on the approximated displacement field; and
obtaining a second deformation displacement field between the first image and the second image using the corresponding information as a constraint which restricts a transformation of the region of interest to the approximation transformation model.

21. An image processing method comprising:
obtaining a first image and a second image obtained by imaging an object under different conditions;
obtaining a first surface shape of the object visualized in the first image and obtain a second surface shape of the object visualized in the second image; and
obtaining a deformation displacement field between the first image and the second image based on evaluation of an error between the first surface shape and the second surface shape,
wherein in the evaluation of the error, an error of a position in a normal direction of a curved surface of one of the first surface shape and the second surface shape is evaluated large, and an error of a position in a direction along the curved surface is evaluated small, and
wherein the deformation displacement field between the first image and the second image is obtained to prevent a surface corresponding point of the first surface shape after the deformation displacement from shifting in the normal direction from a surface corresponding point of the second surface shape based on the evaluation of the error.

22. A non-transitory computer-readable storage medium storing a computer program for causing a computer to execute an image processing method, the method comprising:
obtaining a first image and a second image obtained by imaging an object under different conditions;
obtaining a first surface shape of the object visualized in the first image and obtain a second surface shape of the object visualized in the second image; and
obtaining a deformation displacement field between the first image and the second image based on evaluation of an error between the first surface shape and the second surface shape,
wherein in the evaluation of the error, an error of a position in a normal direction of a curved surface of one of the first surface shape and the second surface shape is evaluated large, and an error of a position in a direction along the curved surface is evaluated small, and
wherein the deformation displacement field between the first image and the second image is obtained to prevent a surface corresponding point of the first surface shape after the deformation displacement from shifting in the normal direction from a surface corresponding point of the second surface shape based on the evaluation of the error.

* * * * *